(12) United States Patent
Numata et al.

(10) Patent No.: US 9,470,825 B2
(45) Date of Patent: Oct. 18, 2016

(54) COLOR FILTER ARRAY, SOLID-STATE IMAGE SENSOR, AND IMAGING DEVICE

(71) Applicant: CANON KABUSHIKI KAISHA, Tokyo (JP)

(72) Inventors: Aihiko Numata, Inagi (JP); Akinari Takagi, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 14/329,075

(22) Filed: Jul. 11, 2014

(65) Prior Publication Data

US 2015/0029366 A1 Jan. 29, 2015

(30) Foreign Application Priority Data

Jul. 23, 2013 (JP) ................................. 2013-152857

(51) Int. Cl.
*H04N 9/04* (2006.01)
*G02B 5/20* (2006.01)

(52) U.S. Cl.
CPC ............ *G02B 5/201* (2013.01); *H04N 2209/04* (2013.01); *H04N 2209/045* (2013.01)

(58) Field of Classification Search
CPC ............... G02B 5/00; H04N 2209/04; H04N 2209/045
USPC ................................................. 348/268–280
See application file for complete search history.

(56) References Cited

U.S. PATENT DOCUMENTS

| | | | |
|---|---|---|---|
| 5,999,236 A * | 12/1999 | Nakajima | ............. C23C 14/185 257/59 |
| 7,852,314 B2 | 12/2010 | Takeuchi et al. | |
| 8,368,898 B2 | 2/2013 | Yamada | |
| 8,514,309 B2 | 8/2013 | Kato et al. | |
| 8,525,282 B2 | 9/2013 | Numata et al. | |
| 8,817,162 B2 | 8/2014 | Takagi | |
| 2008/0151152 A1* | 6/2008 | Yang | .................. G02F 1/133502 349/106 |
| 2010/0053044 A1* | 3/2010 | Lee | ..................... H01L 51/5259 345/80 |
| 2012/0119068 A1 | 5/2012 | Numata | |
| 2012/0262500 A1 | 10/2012 | Kitazawa et al. | |
| 2013/0277541 A1 | 10/2013 | Ikemoto et al. | |
| 2014/0071320 A1 | 3/2014 | Takagi | |
| 2014/0118589 A1 | 5/2014 | Numata | |

FOREIGN PATENT DOCUMENTS

| | | |
|---|---|---|
| JP | 2007-322998 A | 12/2007 |
| JP | 2011-043681 A | 3/2011 |
| JP | 2013-088558 A | 5/2013 |

OTHER PUBLICATIONS

Aihiko Numata, U.S. Appl. No. 14/327,937, filed Jul. 10, 2014.
Aihiko Numata, U.S. Appl. No. 14/327,924, filed Jul. 10, 2014.

* cited by examiner

*Primary Examiner* — Yogesh Aggarwal

(74) *Attorney, Agent, or Firm* — Fitzpatrick, Cella, Harper & Scinto

(57) ABSTRACT

A color filter array includes a plurality of color filters having different center frequencies and each formed of static metal structures and an insulator, a first common electrode formed across the plurality of color filters, a second common electrode opposed to the first common electrode, separated from the static metal structures of the plurality of color filters by the insulator, and formed across the plurality of color filters, and a voltage applying unit configured to apply a voltage between the first common electrode and the second common electrode and change charge density on the surfaces of the static metal structures to thereby simultaneously change the center frequencies of the plurality of color filters.

20 Claims, 17 Drawing Sheets

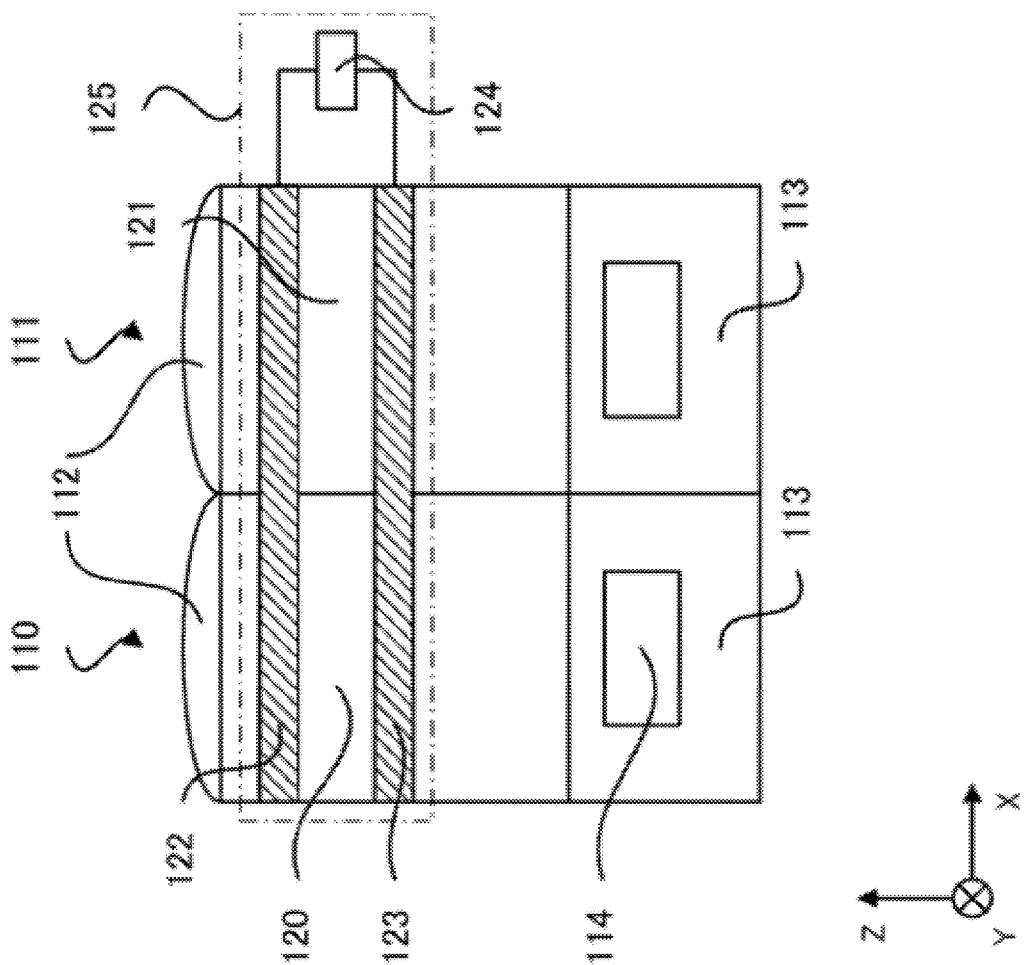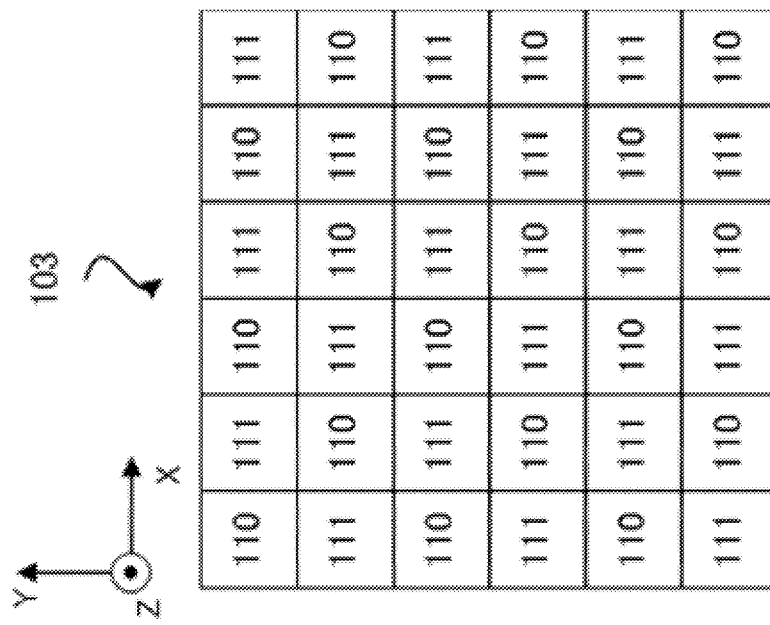

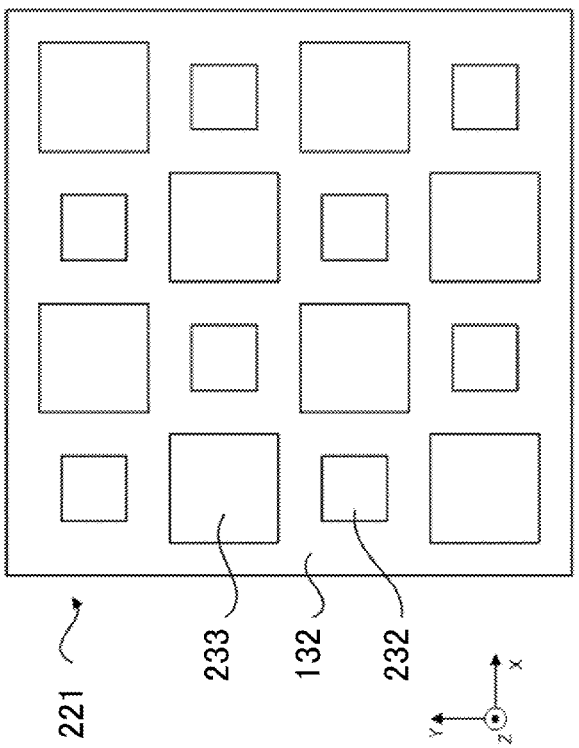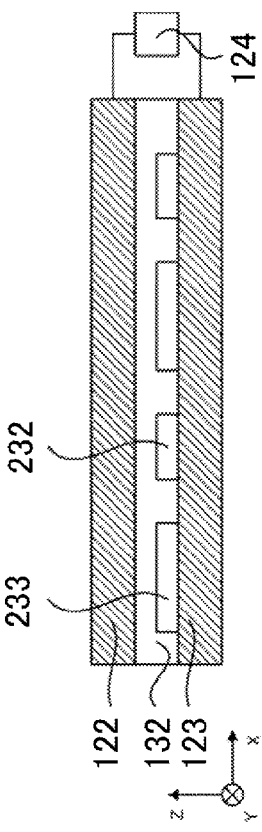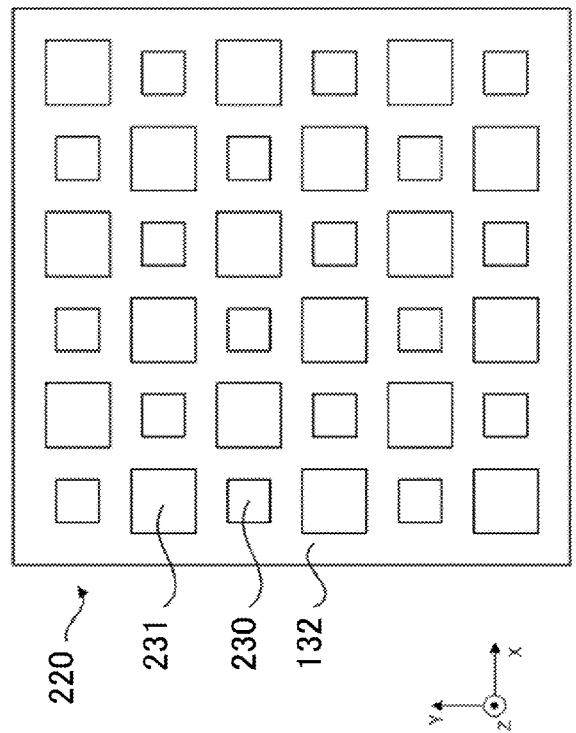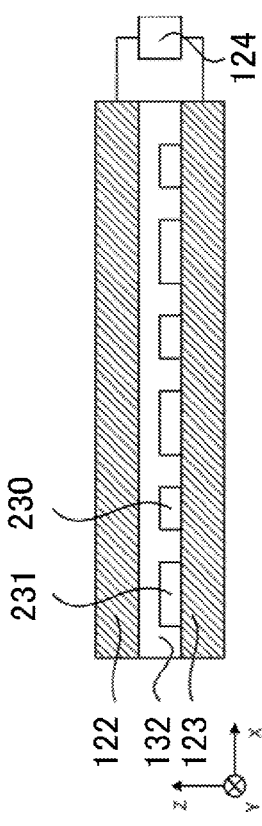

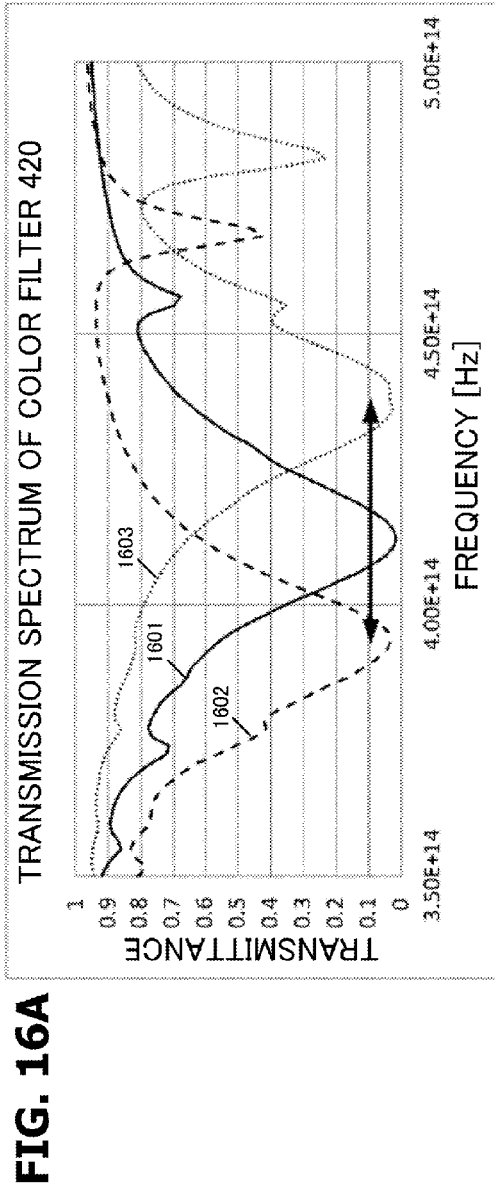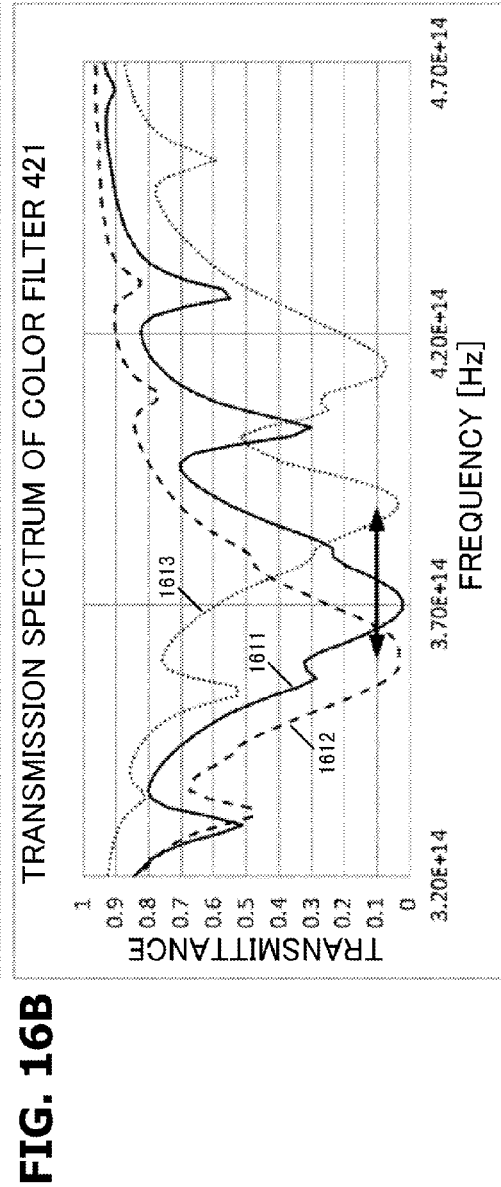
FIG. 16A
FIG. 16B

COLOR FILTER ARRAY, SOLID-STATE IMAGE SENSOR, AND IMAGING DEVICE

BACKGROUND OF THE INVENTION

1. Field of the Invention

The present invention relates to a color filter array and, more particularly, to a color filter array used in a solid-state image sensor used in an imaging device.

2. Description of the Related Art

In recent years, a multiband camera (a multi-spectrum camera) has been proposed in which color filters having different center frequencies are arranged in an array to simultaneously acquire image information and frequency information (a spectral image) of an object. In such a multiband camera, to improve resolution of a frequency to be acquired, it is necessary to arrange a large number of color filters having slightly different center frequencies. However, as types of the color filters are increased, an interval of pixels for acquiring images having the same frequency characteristic is expanded and spatial resolution is deteriorated.

Therefore, a solid-state image sensor is proposed in which characteristics of color filters are variably set to simultaneously improve frequency resolution and spatial resolution. As such a variable color filter, for example, there is a variable color filter disclosed in Japanese Patent Application Laid-open No. 2011-43681.

The variable color filter disclosed in Japanese Patent Application Laid-open No. 2011-43681 is a color filter in which fine metal structures are cyclically arranged to perform wavelength selection making use of surface plasmon. In such a color filter, a dielectric constant variable material such as a ferroelectric substance is used in a dielectric substrate and a refractive index of the ferroelectric substance is changed by voltage application to variably set a filter characteristic.

However, when color filters having different center frequencies are arranged in an array and used in a solid-state image sensor for spectral image acquisition, it is necessary to provide, for each of the color filters, a circuit for voltage application. As a result, an aperture ratio decreases because of the circuit and the transmittance of the color filters decreases. Costs for circuit formation increase.

SUMMARY OF THE INVENTION

In view of the problems, it is an object of the present invention to provide a color filter array that has high transmittance and can be manufactured at low costs.

According to a first aspect of the present invention, there is provided a color filter array including: a plurality of color filters having different center frequencies and each formed of static metal structures and an insulator; a first common electrode formed across the plurality of color filters; a second common electrode opposed to the first common electrode, separated from the static metal structures of the plurality of color filters by the insulator, and formed across the plurality of color filters; and a voltage applying unit configured to apply a voltage between the first common electrode and the second common electrode and change charge density on the surfaces of the static metal structures to thereby simultaneously change the center frequencies of the plurality of color filters.

According to the present invention, it is possible to realize the color filter array that has increased transmittance and can be manufactured at low costs.

Further features of the present invention will become apparent from the following description of exemplary embodiments with reference to the attached drawings.

BRIEF DESCRIPTION OF THE DRAWINGS

FIGS. 2A and 2B are configuration diagrams of a solid-state image sensor according to the first embodiment;

FIGS. 5A to 5D are configuration diagrams of a color filter array according to a second embodiment;

FIGS. 16A and 16B are diagrams of transmission spectra of color filters according to the fourth embodiment.

DESCRIPTION OF THE EMBODIMENTS

Figure 1:
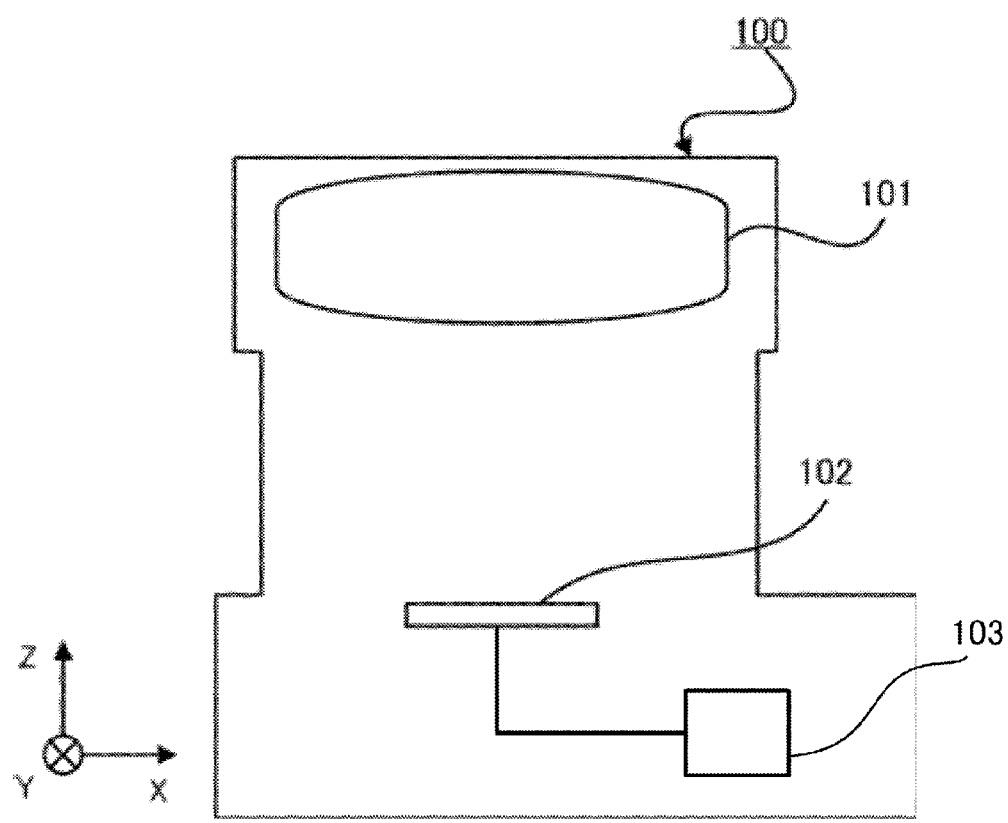
FIG. 1 is a configuration diagram of an imaging device according to a first embodiment.

Color filter arrays in embodiments of the present invention are explained below with reference to the drawings. In the explanation, in all the drawings, components having the same functions are denoted by the same reference numerals and signs. Redundant explanation of the components is omitted.

First Embodiment

<Imaging Device (Spectral Image Acquiring Device)>

An imaging device according to a first embodiment is an imaging device in which a solid-state image sensor including color filters is used. The configuration of an imaging device 100 according to this embodiment is shown in FIG. 1. In FIG. 1, the imaging device 100 includes an imaging optical system 101, a solid-state image sensor 102, and a control unit 103. The solid-state image sensor 102 is arranged on the optical axis of the imaging optical system 101. The imaging optical system 101 forms an object image on the solid-state image sensor 102.

The solid-state image sensor 102 includes color filters capable of changing a frequency band of light transmitted therethrough. The color filters are arranged in an array and respectively transmit lights in different frequency bands. Therefore, the imaging device 100 can acquire frequency information at high resolution. Details of the solid-state image sensor 102 and a color filter array are explained below.

The control unit 103 includes a CPU, a DSP, and a memory having a computer program stored therein. The control unit 103 performs control of acquisition of an object image, a characteristic change of the color filters, and the like. The control unit 103 may be implemented by an ASIC. The control unit 103 acquires an image signal while changing an applied voltage to the color filter array to thereby acquire spectral information in a wide frequency band.

<Configuration of the Solid-State Image Sensor>

FIG. 2A is a plan view of the solid-state image sensor 102. FIG. 2B is a sectional view of the solid-state image sensor 102. The solid-state image sensor 102 includes two kinds of pixels 110 and 111. The pixels 110 and the pixels 111 have different transmission frequency characteristics of the color filters, that is, having different frequency bands of lights to be detected. Each of the pixels has, from a light incident side, a microlens 112, a color filter 120 or 121, and a substrate 113. The microlens 112 is formed of $SiO_2$ or the like, which is a material transparent in the frequency band to be detected. The substrate 113 is formed of a material such as Si that absorbs light in the wavelength band to be detected. In the substrate 113, a photoelectric conversion section 114 is formed. The photoelectric conversion section 114 is formed by implanting ions such as boron into the substrate 113. Not-shown wires are provided in the pixels 110 and 111. Charges generated in the photoelectric conversion section are transferred to a signal processing circuit by the wires. A transfer system for the generated charges may be any transfer system. That is, The solid-state image sensor 102 may be a charge coupled device (CCD) or may be a complementary metal-oxide semiconductor (CMOS).

The pixels 110 and 111 include color filters 120 and 121 having different center frequencies between the microlenses 112 and the substrates 113. A first common electrode 123 and a second common electrode 122 extending across the color filters 120 and 121 are provided to be opposed to each other in the up-down direction (a Z direction) of the color filters. The common electrodes 122 and 123 are formed across a plurality of color filters.

The common electrodes 122 and 123 may be formed of ITO or the like, which is a conductive material transparent in the wavelength bands to be detected. The common electrodes 122 and 123 may be formed of a metal thin film having thickness of about 50 nm or less. Even if the common electrodes 122 and 123 are formed of a metal material opaque in the wavelength bands to be detected, if the metal material is thin, it is possible to suppress absorption of light by the common electrodes 122 and 123.

A voltage applying circuit (a voltage applying section) 124 for applying a voltage to the common electrodes 122 and 123 is further connected to the solid-state image sensor 102. The center frequencies of the color filters 120 and 121 can be simultaneously changed by the applied voltage of the circuit 124.

A section formed by the color filters 120 and 121, the common electrodes 122 and 123, and the voltage applying circuit 124 is referred to as color filter array 125. When viewed from the color filter array 125 side, the color filters 120 and 121 in the color filter array 125 are arranged to correspond to the pixels 110 and 111 of the solid-state image sensor 102.

The pixels 110 (the color filters 120 corresponding to the pixels 110) and the pixels 111 (the color filters 121 corresponding to the pixels 111) do not have to be alternately arranged as shown in FIG. 2A. The arrangement of the pixels may be any arrangement. However, it is preferable that the color filters 120 and 121 having the different center frequencies are arranged adjacent to each other because spatial resolution of an obtained spectral image is uniform in a plane. The solid-state image sensor 102 is explained as including the two kinds of pixels. However, the solid-state image sensor 102 may include three or more kinds of pixels.

As explained above, in this embodiment, the common electrodes are used for the plurality of color filters having the different center frequencies to simultaneously change the center frequencies. Consequently, compared with a color filter array in which a circuit for voltage application is used for each of color filters, it is possible to reduce the number of circuits for voltage application. Therefore, the transmittance of the color filter array 125 is improved and costs for the color filter array 125 are reduced.

<Color Filters>

Figure 3A:
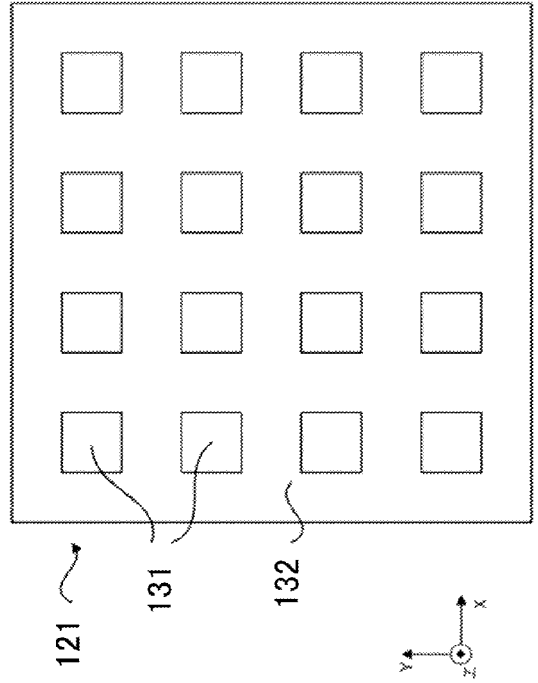
FIGS. 3A to 3D are configuration diagrams of a color filter array according to the first embodiment.
Figure 3B:
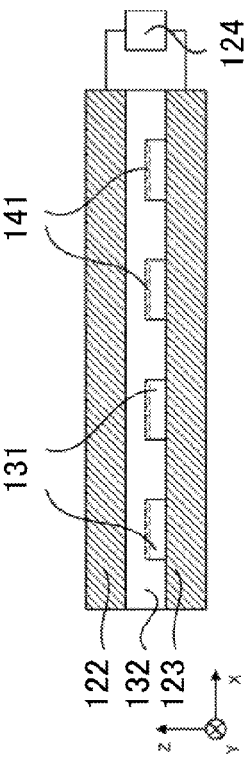
Figure 3C:
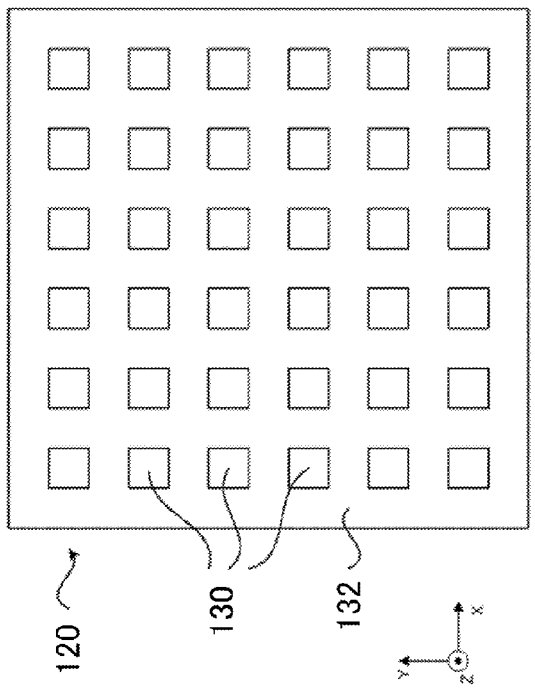
Figure 3D:
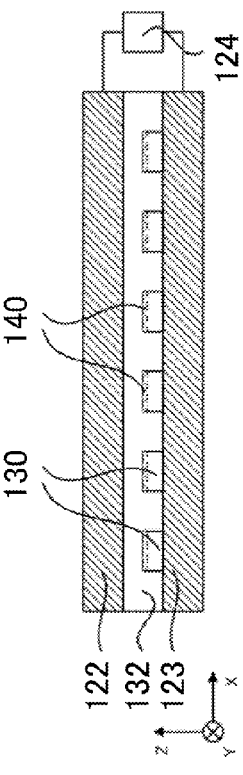

FIGS. 3A to 3D are diagrams showing metal structures in the color filters 120 and 121. FIG. 3A is a plan view of the color filter 120. FIG. 3B is a sectional view of the color filter 120. FIG. 3C is a plan view of the color filter 121. FIG. 3D is a sectional view of the color filter 121.

The color filter 120 has a structure in which static metal structures 130 are provided in an insulator film 132. The color filter 121 has a structure in which static metal structures 131 are provided in an insulator film 132. The metal structures 130 and 131 cause plasmon resonances corresponding to the sizes of the metal structures 130 and 131. Therefore, transmission spectra of the color filters 120 and 121 have dips of the transmission spectra with respect to frequencies at which the plasmon resonances are caused. As in the first embodiment, in the case of a reflective filter in which the transmission spectra of the color filters have the dips as in the first embodiment, frequencies of the dips are referred to as center frequencies of the color filter.

In the first embodiment, the shape of the metal structures 130 is a rectangular parallelepiped having for base a square with a side of 20 nm in an XY plane (a plane parallel to the common electrodes 122 and 123) and a thickness (height) of 5 nm in the Z direction. The shape of the metal structures 131 is a rectangular parallelepiped having for base a square with a side of 50 nm in the XY plane and a thickness (height) of 5 nm in the Z direction. The metal structures 130 and 131 are cyclically arranged in a square lattice shape. The cycles of the metal structures (the distance between the centers of the metal structures) are 40 nm in the metal structures 130 and 100 nm in the metal structures 131. The metal structures 130 and 131 are set in contact with the first common electrode 123 and are separated from the second common electrode 122 by 5 nm via the insulator film 132. The material of the metal structures 130 and 131 is Au and the material of the insulator film 132 is $HfO_2$.

However, the structure explained above is an example. The present invention is not limited to the structure. The sizes (the areas) in the XY plane, the thicknesses in the Z direction, and the cycles of the metal structures may be selected according to frequency bands in which spectral image information is desired to be acquired. In general, the center frequencies are lower as the sizes (the areas) in the XY plane are larger. The metal structures do not always need to be cyclically arrayed. However, it is preferable that the metal structures are cyclically arranged because the plasmon resonances caused by the metal structures intensify each other. As the cycles are set shorter, resonance degrees are higher and the spectrum dips become steeper. The metal structures do not have to be the rectangular parallelepiped. A column, an elliptic cylinder, a polygonal prism, or the like may be used as the metal structures.

As the material of the metal structures, Ag, Pt, Al, or the like may be used besides Au. However, it is preferable to use Au because of chemical stability. As the material of the insulator film 132, $SiO_2$, SiN, $Ta_2O_5$, $La_2O_3$, $TiO_2$, or the like may be used besides $HfO_2$. However, it is preferable to use $HfO_2$ because $HfO_2$ has a large dielectric breakdown voltage and a high voltage can be applied.

A voltage is applied by the circuit 124 through the common electrodes 122 and 123, whereby a potential difference occurs between the second common electrode 122 and the metal structures. Therefore, charge density near the surfaces of the metal structures 130 and 131 on the insulator film 132 side (a +Z side) changes. Since dielectric constants of metal surface layers 140 and 141 of the metal structures 130 and 131 change and a state of the plasmon resonances changes, the center frequencies of the color filters 120 and 121 change.

As explained above, in the present invention, the charge density on the surfaces of the static metal structures is changed by the voltage application. The center frequencies of the color filters are variably set using the dielectric constant change caused by the charge density change.

<Transmission Spectra>

Figure 4A:
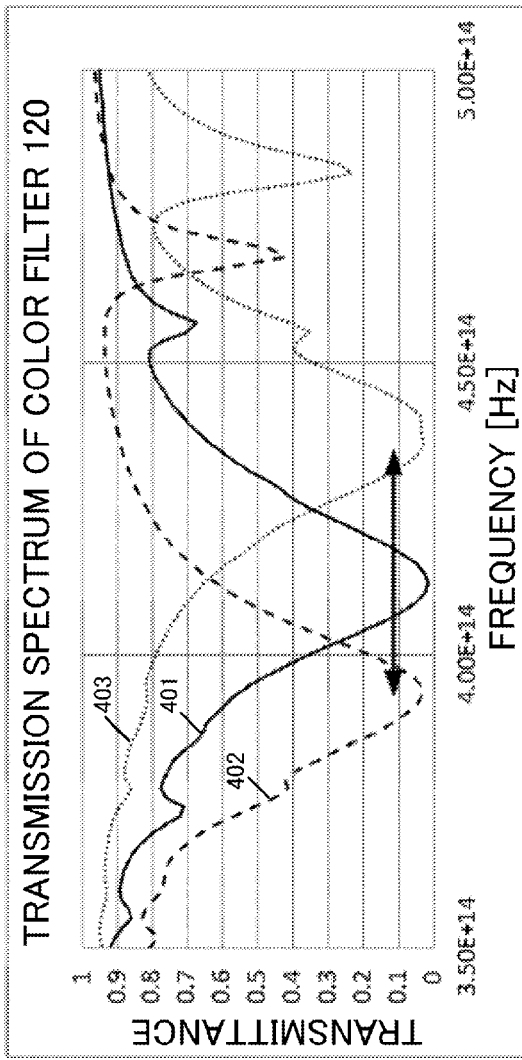
FIGS. 4A and 4B are diagrams showing transmission spectra of color filters according to the first embodiment.
Figure 4B:
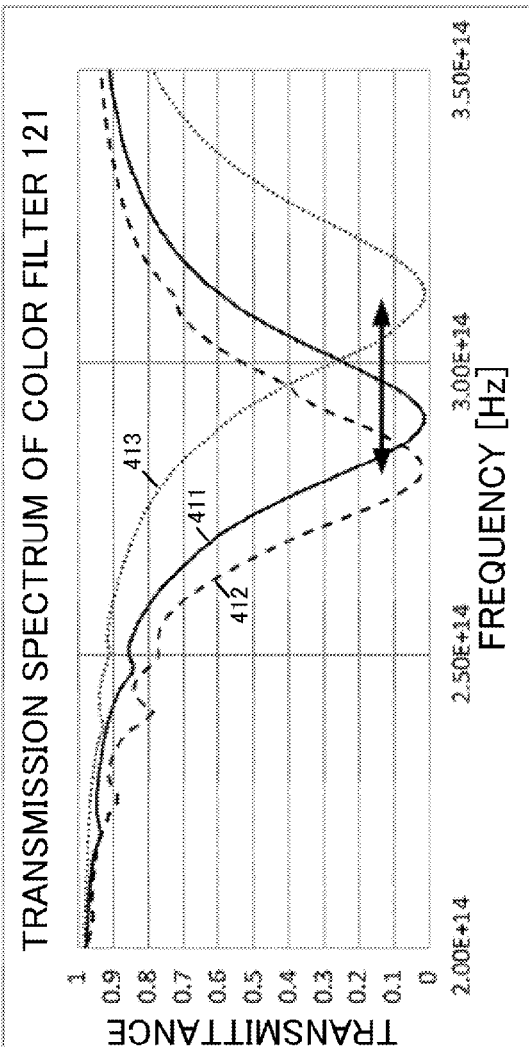

FIGS. 4A and 4B respectively show transmission spectra of the color filters 120 and 121. Solid lines 401 and 411 indicate transmission spectra obtained when a voltage is not applied between the common electrodes 122 and 123. Broken lines 402 and 412 indicate transmission spectra obtained when a voltage of +12 V (equivalent to an electric field of +2.4 V/nm) is applied to the common electrode 123 with respect to the common electrode 122. Dotted lines 403 and 413 indicate transmission spectra obtained when a voltage of −12 V (equivalent to an electric field of −2.4 V/nm) is applied to the common electrode 123 with respect to the common electrode 122.

When the applied voltage is changed from +12 V to −12 V, a dip of the transmission spectrum of the color filter 120 changes from a frequency of 0.393 PHz to a frequency of 0.436 PHz. On the other hand, a dip of the transmission spectrum of the color filter 121 changes from a frequency of 0.282 PHz to a frequency of 0.312 PHz. PHz means petahertz ($10^{15}$ Hz).

<Effects of this Embodiment>

As explained above, since the sizes (the areas) in the XY plane of the metal structures 130 and the metal structures 131 are different, the color filter array 125 can simultaneously acquire spectral information at different frequencies. Specifically, the color filter array 125 may acquire image information while changing the voltage applied between the common electrodes 122 and 123 with the single circuit 124. As a result, it is possible to simultaneously acquire spectral image information at a frequency of 0.282 PHz to a frequency of 0.312 PHz and at a frequency of 0.393 PHz to a frequency of 0.436 PHz.

In the conventional color filter array disclosed in Japanese Patent Application Laid-open No. 2011-43681, the circuits for applying voltages to the respective color filters are independently provided. Therefore, the circuits are necessary by the number of the color filters. On the other hand, in the color filter array according to this embodiment, the center frequencies of the plurality of color filters having different center frequencies can be simultaneously changed by the single circuit. Therefore, it is possible to realize improvement of transmittance and reduction in costs compared with the related art.

<Acquisition Method for Spectral Information>

The color filter 120 and the color filter 121 explained in the first embodiment are filters having dips in transmittances. Therefore, in obtained spectral information, spectral information at a specific frequency is lost from spectral information at all frequencies. Conversely, when it is desired to obtain only spectral information at a specific frequency, the spectral information may be calculated by subtracting a value of a spectral image signal at the specific frequency from a value obtained by adding up spectral image signals at all the frequencies. It is also possible that pixels not provided with a color filter are provided and the spectral information is calculated by subtracting a spectral image signal acquired by pixels provided with a color filter from spectral image signals of all frequency components acquired in the pixels.

<Manufacturing Method for the Color Filters>

The metal structures forming the color filters can be manufactured by forming, from a resist, reversal patterns in plan view of the metal structures through photolithography, EB lithography, or the like and, after forming metal films through EB vapor deposition, sputtering, or the like, performing liftoff. Alternatively, the metal structures may be manufactured by first forming metal thin films that form the metal structures, forming, from a resist, plan view patterns of the metal structures through lithography, and performing dry etching.

Second Embodiment

A second embodiment is different from the first embodiment in the configuration of a color filter array in a solid-state image sensor. Transmission spectra of color filters forming a color filter array 225 according to this embodiment have two dips. That is, the color filters are transmissive color filters, the transmission spectra of which have peaks in the middle of the two dips. The color filter array is formed by such a plurality of transmissive color filters.

In the case of the transmissive filters, the transmission spectra of which have the peaks in the middle of the dips (see FIGS. 6A to 6D) as in the second embodiment, frequencies of the peaks are referred to as center frequencies of the color filters. The color filter array 225 is different from the color filter array 125 in the first embodiment only in metal structures forming the color filters.

<Color Filters>

FIGS. 5A to 5D are diagrams showing metal structures in color filters 220 and 221 forming the color filter array 225. FIG. 5A is a plan view of the color filter 220. FIG. 5B is a sectional view of the color filter 220. FIG. 5C is a plan view of the color filter 221. FIG. 5D is a sectional view of the color filter 221.

The color filter 220 includes a plurality of kinds of metal structures 230 and 231 having different sizes in the XY plane. The color filter 221 includes a plurality of kinds of metal structures 232 and 233 having different sizes in the XY plane. The metal structures 230, 231, 232, and 233 cause plasmon resonances corresponding to the sizes thereof. Therefore, the color filter 220 has dips of two transmission spectra corresponding to frequencies of the plasmon resonances caused by the metal structures 230 and 231. Similarly, the color filter 221 has dips of two transmission spectra corresponding to frequencies of the plasmon resonances caused by the metal structures 232 and 233. Therefore, the transmission spectra of the color filters 220 and 221 are transmission spectra having peaks in the middle of two resonance dips.

The shape of the metal structures 230 is a rectangular parallelepiped having for base a square with a side of 20 nm in the XY plane and a thickness (height) of 5 nm in the Z direction. The shape of the metal structures 231 is a rectangular parallelepiped having for a base a square with a side of 25 nm in the XY plane and a thickness (bight) of 5 nm in the Z direction. The shape of the metal structures 232 is a rectangular parallelepiped having for base a square with a side of 40 nm in the XY plane and a thickness (height) of 5 nm in the Z direction. The shape of the metal structures 233 is a rectangular parallelepiped having for base a square with a side of 50 nm in the XY plane and a thickness (height) of 5 nm in the Z direction. In the color filter 220, the metal structures 230 and 231 are alternately cyclically arranged in a square lattice shape. Similarly, in the color filter 221, the metal structures 232 and 233 are alternately cyclically arranged in a square lattice shape. Cycles of the metal structures 230 and 231 (the distance between the centers of the metal structures adjacent to each other) are 40 nm. Cycles of the metal structures 232 and 233 are 80 nm. The metal structures 230 to 233 are set in contact with the first common electrode 123 and are separated from the second common electrode 122 by 5 nm via the insulator film 132. The material of the metal structures 230 to 233 is Au and the material of the insulator film 132 is $HfO_2$.

However, as in the first embodiment, the structure of the metal structures is not limited to this structure. The sizes, the thicknesses, and the cycles of the metal structures, the metal material, and the insulator material may be selected according to frequency bands in which spectral information is desired to be acquired. The metal structures 230 (232) and the metal structures 231 (233) are alternately arrayed. However, the metal structures 230 (232) and the metal structures 231 (233) do not always have to be arrayed in this way. However, it is preferable to evenly array the metal structures because transmission spectra are uniform over the entire area of the color filters.

<Transmission Spectra>

Figure 6A:
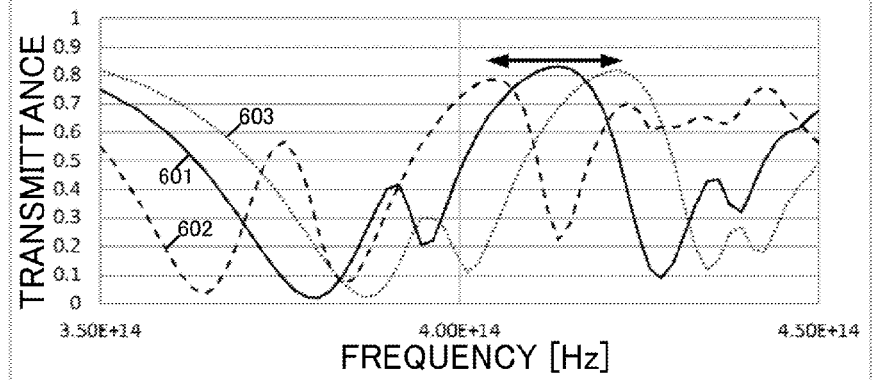
FIGS. 6A to 6D are diagrams showing transmission spectra of color filters according to the second embodiment.
Figure 6B:
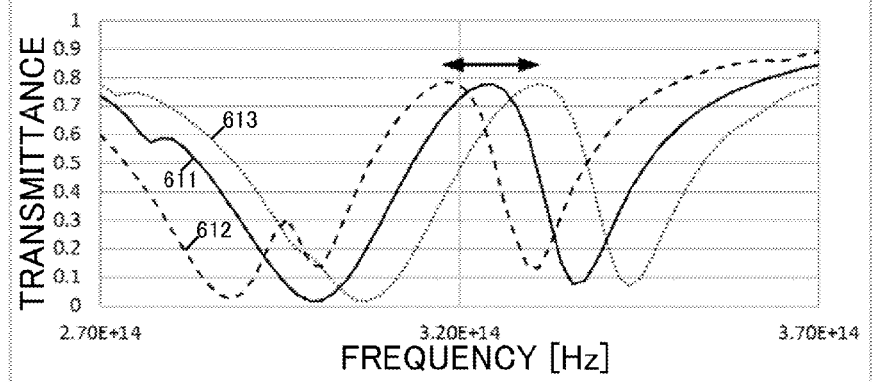

FIGS. 6A and 6B respectively show transmission spectra of the color filters 220 and 221. Solid lines 601 and 611 indicate transmission spectra obtained when a voltage is not applied between the common electrodes 122 and 123. Broken lines 602 and 612 indicate transmission spectra obtained when a voltage of +12 V (equivalent to an electric field of +2.4 V/nm) is applied to the common electrode 123 with respect to the common electrode 122. Dotted lines 603 and 613 indicate transmission spectra obtained when a voltage of −4 V (equivalent to an electric field of −0.8 V/nm) is applied to the common electrode 123 with respect to the common electrode 122.

When the applied voltage is changed from +12 V to −4 V, a peak of the transmission spectrum of the color filter 220 changes from a frequency of 0.404 PHz to a frequency of 0.422 PHz. On the other hand, a peak of the transmission spectrum of the color filter 221 changes from a frequency of 0.318 PHz to a frequency of 0.331 PHz. Therefore, the color filter array 225 can simultaneously acquire spectral image information at a frequency of 0.318 PHz to a frequency of 0.331 PHz and at a frequency of 0.404 PHz to a frequency of 0.422 PHz using a single circuit. Specifically, as in the first embodiment, the color filter array 225 may acquire image information while changing the voltage applied between the common electrodes 122 and 123 with the single circuit 124.

In the color filter array 225 in the second embodiment, the color filters, the transmittances of which have the peaks, are used. Therefore, unlike the color filter array 125 in the first embodiment, it is possible to acquire spectral information at a specific frequency without performing the subtraction processing.

When the color filters, the transmittances of which have the peaks, are used as in the second embodiment, it is preferable to limit respective color filter transmission bands by combining absorption filters formed by pigment or the like. A reason for this is explained below.

Figure 6C:
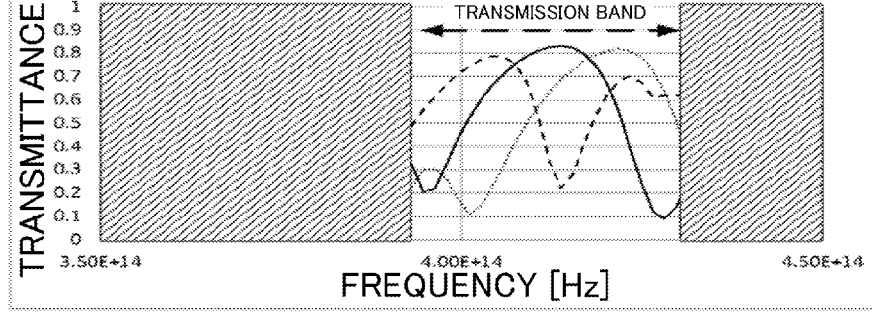
Figure 6D:
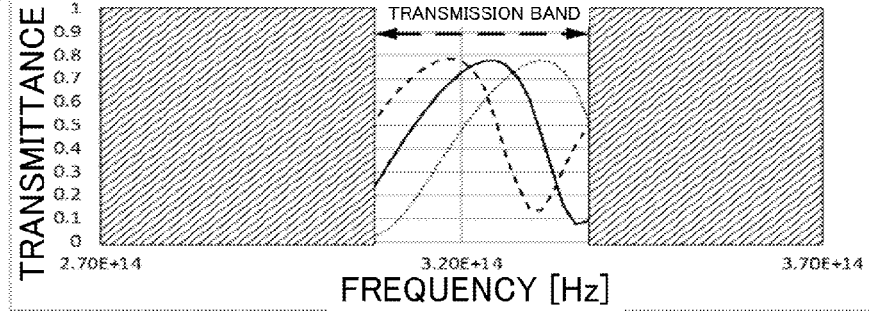

As shown in FIGS. 6A and 6B, the color filters 220 and 221 transmit not only lights having frequencies near the peaks of the transmission spectra (near 0.42 PHz and near 0.32 PHz) but also lights having frequencies on the outer sides of dips of the transmission spectra. As a result, spectral information of other frequencies overlaps spectral information acquired by the color filters 220 and 221 and the quality of the spectral information is deteriorated. It is preferable to use the color filter array including the absorption filters for limiting transmission bands in addition to the color filters formed by the metal structures because the quality of spectral information is improved. For example, it is preferable to limit a transmission band to 0.393 PHz to 0.430 PHz as shown in FIG. 6C in the color filter 220 and limit a transmission band to 0.307 PHz to 0.337 PHz as shown in FIG. 6D in the color filter 221.

<Number Densities of the Metal Structures>

When the color filters are formed from the metal structures having the different sizes, it is preferable that a number density of the metal structures small in an in-plane direction (the XY direction) is larger than a number density of the metal structures large in the in-plane direction (the XY direction). This is because, when the metal structures having the different sizes arranged at the same number density, since the larger metal structures cause stronger resonance, asymmetry of peak shapes of spectra generated in the middle of resonance dips increases. When the asymmetry of the transmission spectra is large, deterioration in the quality of spectral information is caused. In particular, the transmission spectra are more asymmetrical as a difference among the sizes of the plurality of metal structures is larger.

Figure 7A:
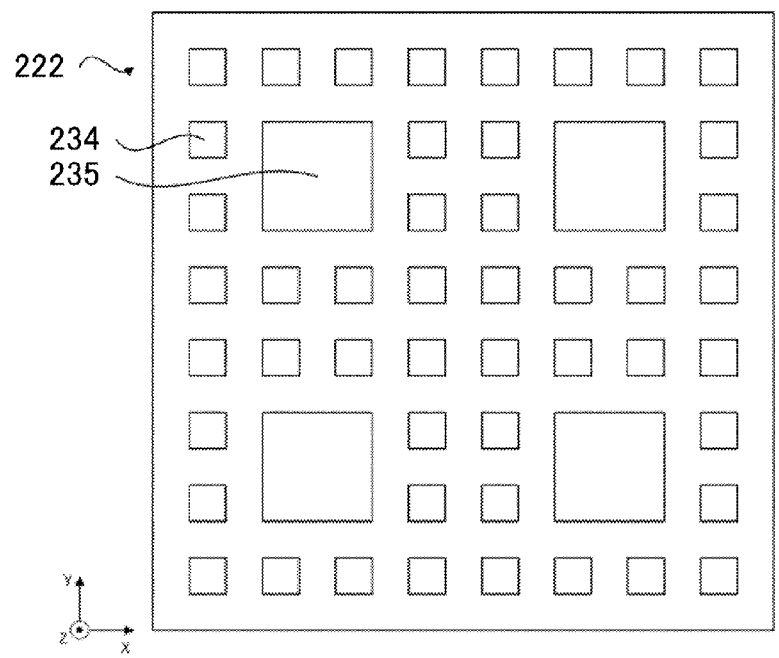
FIGS. 7A and 7B are configuration diagrams of a color filter array according to a modification of the second embodiment.
Figure 7B:
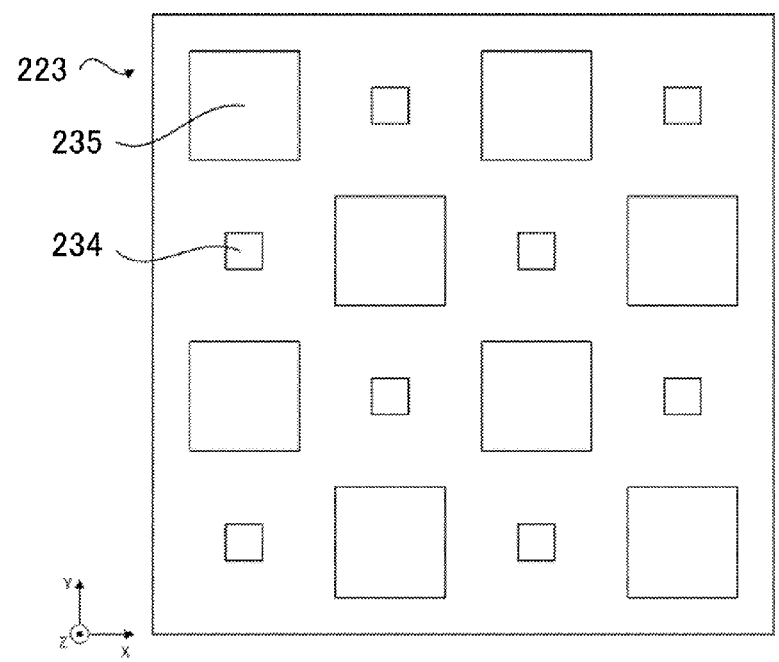

An example is explained in which the density of the metal structures small in the in-plane direction is set larger than the density of the metal structures large in the in-plane direction. A color filter 222 shown in FIG. 7A includes metal structures 234 and metal structures 235. The size in the XY direction of the metal structures 234 is 20 nm on one side. The size in the XY direction of the metal structures 235 is 60 nm on one side. The thickness is 5 nm in both the metal structures 234 and 235. The metal structures 234 and 235 are arranged such that a number density of the metal structures 234 is 12 times as large as a number density of the metal structures 235. In FIG. 7B, for comparison, a color filter 223 is shown in which the number densities of the metal structures 234 and the metal structures 235 are equal. The material of the metal structures 234 and 235 is Au and the material of the insulator film is $HfO_2$.

Figure 8:
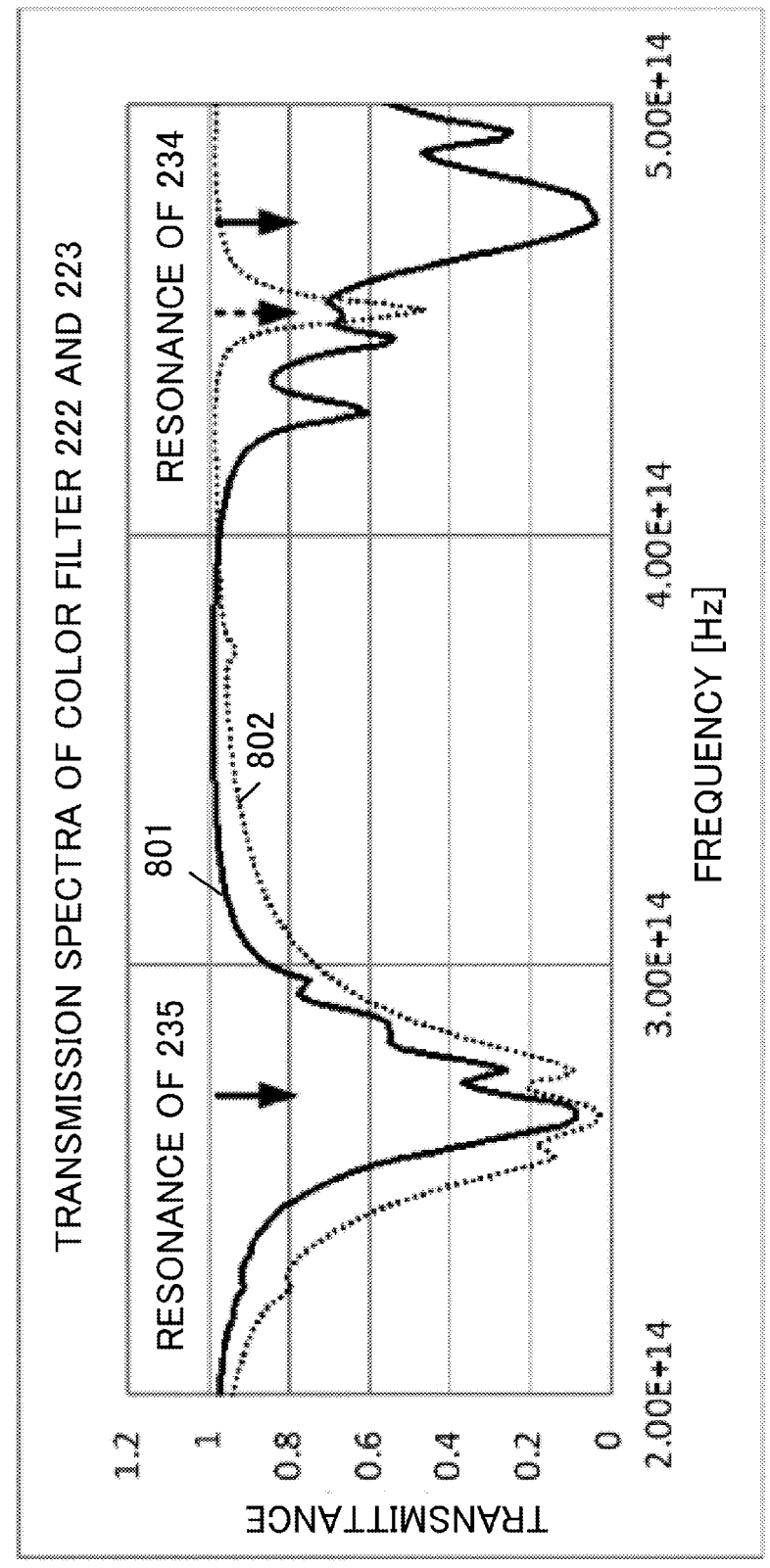
FIG. 8 is a diagram showing transmission spectra of color filters according to the modification of the second embodiment.

Transmission spectra of the color filters 222 and 223 are shown in FIG. 8. A solid line 801 indicates a transmission spectrum of the filter 222. A solid line 802 indicates a transmission spectrum of a color filter (a comparative example) 223. As it is seen from FIG. 8, in the color filter 223 in which the number densities of the metal structures are equal, a dip on a high frequency side caused by resonance of the metal structures 234 is weak compared with a dip on a low frequency side caused by resonance of the metal structures 235. Therefore, the shape of the transmission spectrum is asymmetrical. On the other hand, in the color filter 222 in which the number density of the metal structures 234 having the small in-plane size is set larger than the number density of the metal structures 235 having the large in-plane size, symmetry of the shape of the transmission spectrum is improved. This is because the density of the metal structures 234 having relatively weak resonance is set higher than the number density of the metal structures 235 having relatively strong resonance to increase the intensity of the resonance dip on the high frequency side to the same degree as the resonance dip on the low frequency side. As a result, the symmetry of the transmission spectrum is improved and the quality of spectral information is improved. In this case, it is more preferable to equalize products of the in-plane sizes (areas) of the metal structures and the number densities of the metal structures because the shape of the transmission spectral is close to symmetry.

<Hole Type>

Figure 9A:
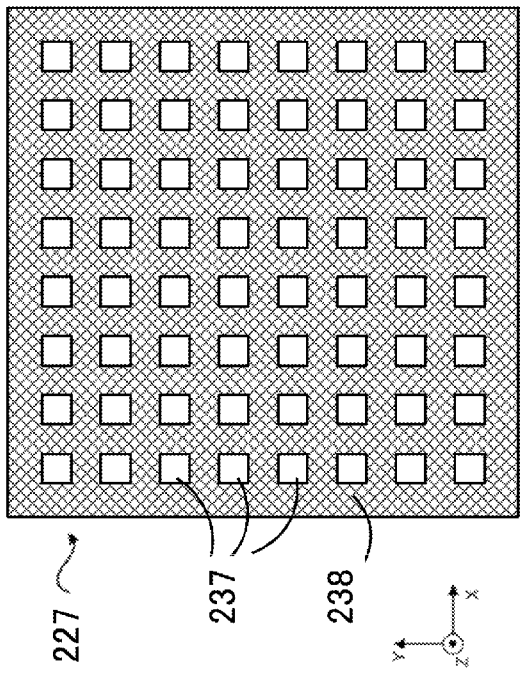
FIGS. 9A to 9D are configuration diagrams of a color filter array according to another modification of the second embodiment.
Figure 9C:
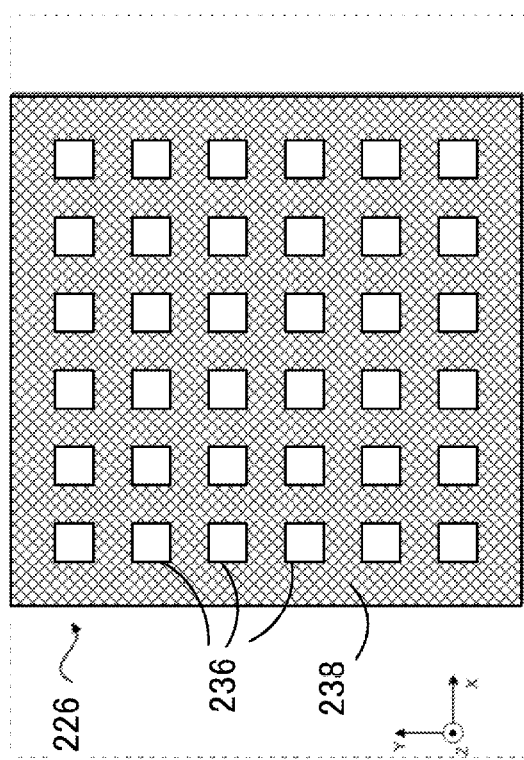
Figure 9B:
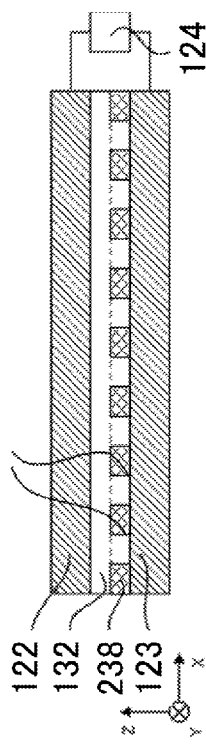
Figure 9D:
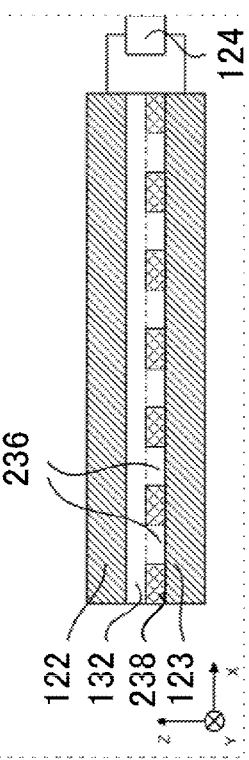

In the color filters 220 and 221 shown in FIGS. 5A to 5D, the two different metal structures of the rectangular parallelepipeds having the different sizes are provided in the insulating film to realize the color filters, the transmission spectra of which have the peaks. However, the metal structures of the color filters may have a shape in which a part of a metal film is removed. This configuration is referred to as hole type. FIGS. 9A and 9C are respectively plan views of color filters 226 and 227 of the hole type. FIGS. 9B and 9D are respectively sectional views of the color filters 226 and 227. In FIGS. 9A to 9D, a hatched portion (238) is the metal film and white void portions (236 and 237) are vacancies. The color filters 226 and 227 shown in FIGS. 9A to 9D have a structure in which the discrete vacancies 236 and 237 are provided in the metal film 238 and the vacancies are filled with the insulator 132. The shape of the vacancies 236 is a rectangular parallelepiped having for base a square with a side of 20 nm in the XY plane and a thickness (height) of 5 nm in the Z direction. The shape of the vacancies 237 is a rectangular parallelepiped having for base a square with a side of 15 nm in the XY plane and a thickness (height) of 5 nm in the Z direction. The vacancies 236 are cyclically arrayed in the XY direction at a cycle of 40 nm. The vacancies 237 are cyclically arrayed in the XY direction at a cycle of 30 nm. The metal film 238 is set in contact with the first common electrode 123 and separated from the second common electrode 122 by 5 nm via the insulator film 132. The material of the metal film 238 is Au and the material of the insulator film 132 is $HfO_2$.

Figure 10A:
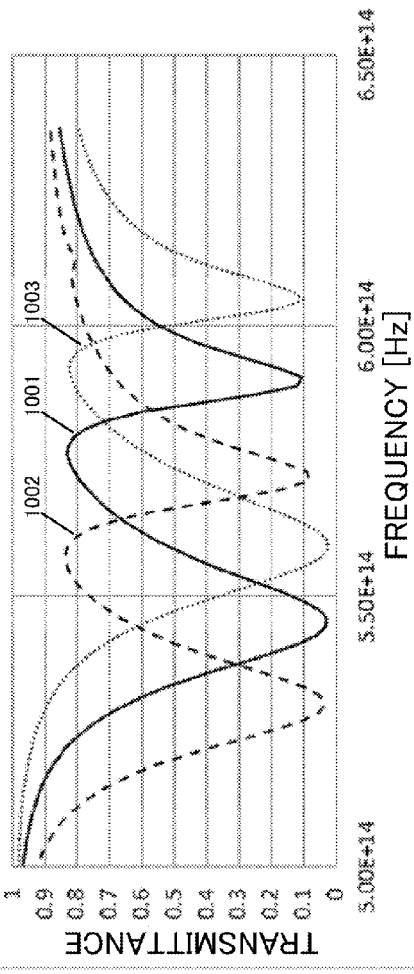
FIGS. 10A and 10B are diagrams showing transmission spectra of color filters according to the other modification of the second embodiment.
Figure 10B:
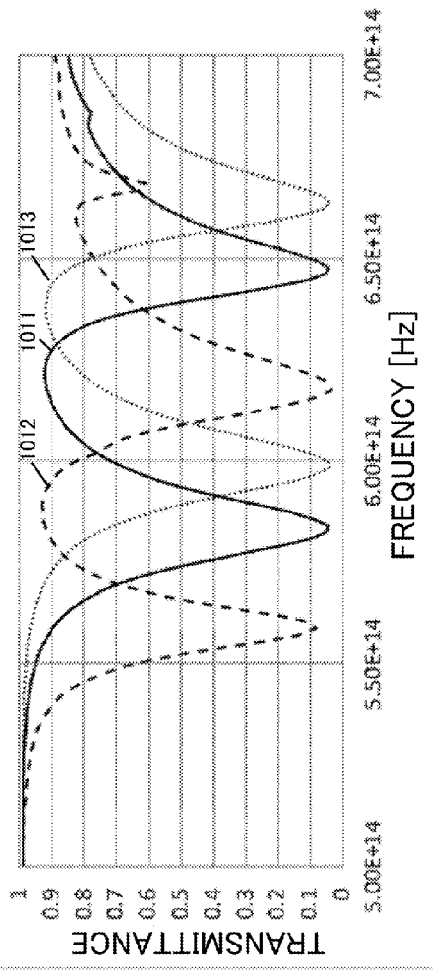

FIGS. 10A and 10B are respectively transmission spectra of the color filter 226 and the color filter 227. Solid lines 1001 and 1011 indicate transmission spectra obtained when a voltage is not applied between the common electrodes 122 and 123. Broken lines 1002 and 1012 indicate transmission spectra obtained when a voltage of +4 V (equivalent to an electric field of +0.8 V/nm) is applied to the common electrode 123 with respect to the common electrode 122. Dotted lines 1003 and 1013 indicate transmission spectra obtained when a voltage of −4 V (equivalent to an electric field of −0.8 V/nm) is applied to the common electrode 123 with respect to the common electrode 122.

When the applied voltage is changed from +4 V to −4 V, a peak of the transmission spectrum of the color filter 226 changes from a frequency of 0.557 PHz to a frequency of 0.592 PHz. On the other hand, a peak of the transmission spectrum of the color filter 227 changes from a frequency of 0.589 PHz to a frequency of 0.637 PHz. Therefore, color filter arrays shown in FIGS. 10A and 10B can acquire spectral information at a frequency of 0.557 PHz to a frequency of 0.637 PHz using a single circuit.

Third Embodiment

A third embodiment is different from the first and second embodiments in the configuration of a color filter array in a solid-state image sensor. In the color filter array according to the third embodiment, structures of respective color filters are changed (adjusted) according to necessary frequency resolution of spectral information.

Necessary frequency resolution of an imaging device depends on a use of the imaging device. In the case of a general imaging device used in a variety of uses, necessary frequency resolution is uniform in a wideband frequency range. On the other hand, when specific frequency information is important in an imaging device for medical use or the like, necessary frequency resolution is different depending on a frequency band.

The same voltage is applied to a plurality of color filters in the color filter array according to this embodiment by common electrodes. Therefore, it is impossible to obtain the necessary frequency resolution by changing the applied voltage for each of the color filters as in Japanese Patent Application Laid-open No. 2011-43681. In the color filter array in this embodiment, a color filter array 325 adapted to necessary frequency resolution ($\Delta F$) is realized by changing sensitivity ($\Delta Fc/\Delta V$) of a center frequency shift amount to a voltage.

Specifically, the color filter array 325 may be formed in a structure in which a color filter, the necessary frequency resolution $\Delta F$ of which is finer, has smaller sensitivity ($\Delta Fc/\Delta V$) of a center frequency shift to a voltage. When a color filter, a transmission spectrum of which has a dip, is used as in the first embodiment, the center frequency indicates a frequency of the dip. On the other hand, when a color filter, a transmission spectrum of which has a peak, is used as in the second embodiment, the center frequency indicates a frequency of the peak. The center frequency shift sensitivity to the voltage means a shift amount of the center frequency of the color filter at the time when a fixed voltage is applied to the color filter.

<Control Method for Sensitivity>

A method of controlling sensitivity to a voltage is explained below. When a voltage $\Delta V$ is applied between common electrodes, a charge density change $\Delta Q$ corresponding to a voltage change $\Delta V$ is induced on metal structure surfaces. A shift $\Delta Fc$ of a center frequency Fc occurs according to the charge density change $\Delta Q$. Therefore, to control a value of the sensitivity $\Delta Fc/\Delta V$ to the voltage, $\Delta Q/\Delta V$ may be controlled or $\Delta Fc/\Delta Q$ may be controlled.

(1. Thickness of a Metal Layer)

First, a method of controlling $\Delta Fc/\Delta Q$ is explained. Table 1 shows dependency of $\Delta Fc/Fc$ on the thickness of metal structures that occurs when dielectric constant changes on metal surface layers are equal (e.g., charge density changes are equal). In Table 1, a shift amount of the center frequency between application time of a voltage of +12 V and application time of a voltage of −12 V is represented as $\Delta Fc$ (i.e., $\Delta V$ is 24 V). As it is seen from Table 1, $\Delta Fc/Fc$ is larger as the thickness of the metal structures is larger irrespective of a size and a cycle in an in-plane direction of the metal structures.

TABLE 1

| Length of one side in XY direction [nm] | Cycle in XY direction [nm] | Metal structure thickness [nm] | ΔFc/Fc |
|---|---|---|---|
| 20 | 40 | 5 | 0.102 |
| 50 | 100 | 5 | 0.104 |
| 25 | 100 | 5 | 0.106 |
| 20 | 40 | 10 | 0.053 |
| 50 | 100 | 10 | 0.051 |
| 25 | 100 | 10 | 0.048 |
| 20 | 40 | 20 | 0.018 |
| 50 | 100 | 20 | 0.018 |
| 25 | 100 | 20 | 0.023 |

This is because the thickness of the metal surface layers is substantially fixed irrespective of the thickness of the metal structures and a volume filling ratio of the metal surface layers to the entire metal structures is smaller as the thickness of the metal structures is larger. As the thickness of the metal structures is larger, the influence of a dielectric constant change of the metal surface layers on a dielectric constant change of the entire metal structures is smaller. Therefore, as the thickness of the metal structures is larger, the center frequency shift of the color filter is smaller and ΔFc/Fc is smaller. From Table 1, it is seen that ΔFc/Fc is substantially inversely proportional to the thickness h of the metal structures (ΔFc/Fc~1/h). As a value obtained by dividing the thickness of the metal structures by XY direction length is larger, ΔFc/Fc deviates from the inverse proportion. This is because the influence of the side surfaces of the metal structures cannot be neglected.

From the above, it is seen that the shift amount ΔFc of the center frequency that occurs when the predetermined charge density change ΔQ is induced is proportional to the center frequency Fc and substantially inversely proportional to the thickness h of the metal structures (ΔFc/ΔQ~Fc/h). Therefore, to obtain the necessary frequency resolution ΔF, a ratio of the center frequency Fc of the color filter and the thickness h of the metal structures may be controlled according to ΔF. For example, to obtain the same frequency resolution, in the color filter having a higher center frequency, the thickness of the metal structures may be set larger.

Because of the reason explained above, it is preferable that the thickness h of the metal structures is smaller because the center frequency shift (ΔFc/ΔV) of the color filter is larger when the same voltage is applied. The thickness of the metal surface layers formed when a voltage is applied to the metal structures is about 0.5 nm. Therefore, the thickness of the metal structures is preferably equal to or smaller than 20 nm. On the other hand, manufacturing is difficult when the thickness of the metal structures is too small. Therefore, it is preferable that the thickness of the metal structures is preferably equal to or larger than 1 nm and equal to or smaller than 20 nm.

(2. Capacitance)

A method of controlling ΔQ/ΔV is explained. When the voltage ΔV is applied between the common electrodes, the charge density change ΔQ induced in the metal surface layers is determined by a product of capacitance C of a capacitor formed between the metal structures and the second common electrode and ΔV (ΔQ~C×ΔV). The capacitance C is proportional to a dielectric constant ∈ of the insulator and inversely proportional to a distance d between the metal structures and the second common electrode. Therefore, ΔQ/ΔV is proportional to the dielectric constant ∈ and inversely proportional to the distance d (ΔQ/ΔV~∈/d). Therefore, to reduce ΔQ/ΔV, C may be reduced, that is, the dielectric constant ∈ of the insulator may be reduced or the distance d between the metal structures and the second common electrode may be increased.

The shift amount ΔFc of the center frequency that occurs when the predetermined charge density change ΔQ is induced is proportional to the center frequency Fc (ΔFc/ΔQ~Fc). Therefore, the shift amount ΔFc/ΔV of the center frequency that occurs when a unit voltage is applied is proportional to the dielectric constant ∈ of the insulator and inversely proportional to the distance d between the metal structures and the second common electrode (ΔFc/ΔV~(ΔFc/ΔQ)×(ΔQ/ΔV)~(Fc/h)×(∈/d)). When the thickness h of the metal structures is fixed, to obtain the necessary frequency resolution ΔF, the center frequency Fc of the color filter, the dielectric constant ∈ of the insulator, and the distance d between the metal structures and the second common electrode may be controlled according to ΔF. For example, if the necessary frequency resolution ΔF is controlled according to only the dielectric constant ∈ of the insulator, the dielectric constant ∈ of the insulator may be set smaller as a value obtained by dividing the necessary frequency resolution ΔF by the center frequency Fc of the color filter is smaller. Alternatively, if the necessary frequency resolution ΔF is controlled according to only the distance d between the metal structures and the second common electrode, the distance d may be set larger as the value obtained by dividing the necessary frequency resolution ΔF by the center frequency Fc of the color filter is smaller.

Because of the reason explained above, it is preferable that the distance between the metal structures and the second common electrode is smaller because the center frequency shift of the color filter that occurs when the same voltage is applied is larger. On the other hand, manufacturing is difficult when the distance between the metal structures and the second common electrode is too small. Therefore, the distance between the metal structures and the second common electrode is preferably equal to or larger than 1 nm and equal to or larger than 20 nm.

As explained above, as the value obtained by dividing the necessary frequency resolution ΔF by the center frequency Fc of the color filter is smaller, the thickness h of the metal structures may be set smaller, the dielectric constant ∈ of the insulator may be set smaller, or the distance d between the metal structures and the second common electrode may be set large. Two or more among these three conditions may be changed in combination. As explained above, since (ΔFc/ΔV~(Fc/h)×(∈/d), a value of (Fc/h)×(∈/d) may be adjusted as appropriate according to the necessary frequency resolution ΔF. In this way, by controlling the sensitivity ΔFc/ΔV to the voltage according to the necessary frequency resolution, the quality of spectral information is improved.

<A. Frequency Resolution is Fixed>

A specific example is explained below. First, in the following explanation, the necessary frequency resolution ΔF is fixed irrespective of a frequency. To fix the sensitivity (ΔFc/ΔV) of the center frequency shift to the voltage, specifically, the thickness of the metal structures may be set smaller, the dielectric constant of the insulator may be set smaller, or the distance between the metal structures and the second common electrode may be set larger in a color filter having the larger center frequency Fc. If a ratio of the center frequency Fc and h×d/∈ is fixed in all the color filters, the shift amount of the center frequency per unit voltage can be set the same.

(A-1. Control According to the Thickness of the Metal Structures)

Figure 11A:
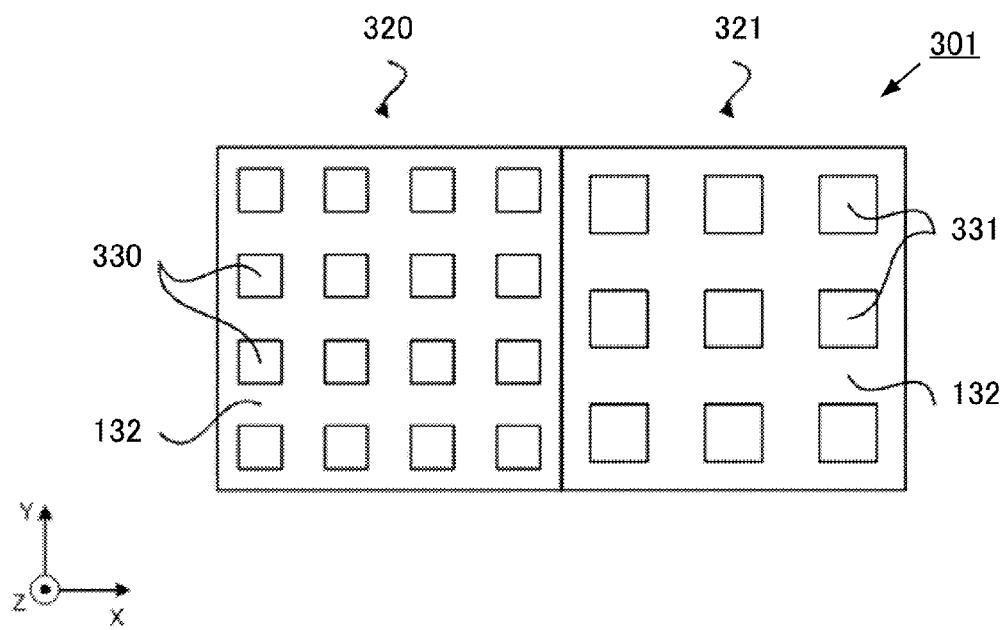
FIGS. 11A and 11B are configuration diagrams of a color filter array according to a third embodiment.
Figure 11B:
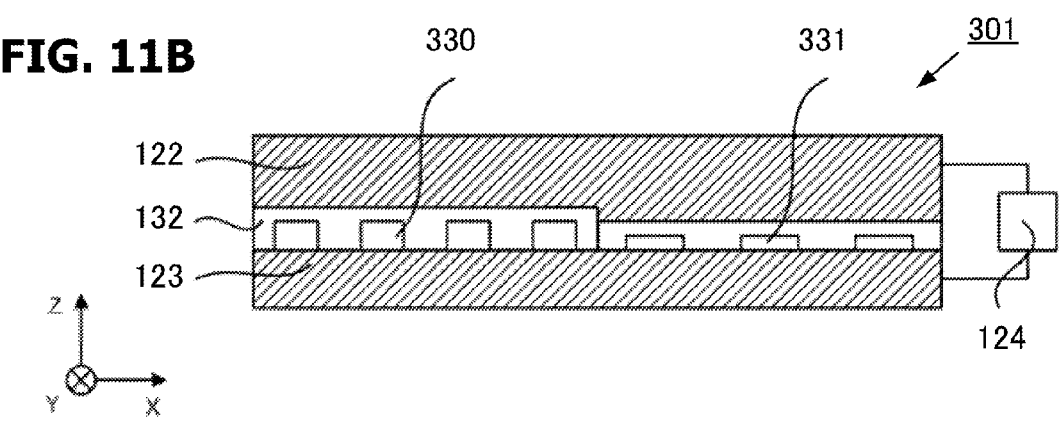

FIGS. 11A and 11B show an example of a color filter array 301 in which the thickness h of the metal structures is changed. FIG. 11A is a plan view of the color filter array 301. FIG. 11B is a sectional view of the color filter array 301. The shape of metal structures 330 forming a color filter 320 is a rectangular parallelepiped having for base a square with a side of 20 nm in the XY plane and a thickness (height) of 10 nm in the Z direction. The metal structures 330 are arranged in a square lattice shape at a cycle of 40 nm. The shape of the metal structures 331 forming a color filter 321 is a rectangular parallelepiped having for base a square with a side of 65 nm in the XY plane and a thickness (height) of 5 nm in the Z direction. The metal structures 331 are arranged in a square lattice shape at a cycle of 130 nm. The metal structures 330 and 331 are set in contact with the first common electrode 123 and are separated from the second common electrode 122 by 5 nm via the insulator film 132. The material of the metal structures 330 and 331 is Au and the material of the insulator film 132 is $HfO_2$.

In Table 2, center frequency shifts of the color filter 320 and the color filter 321 that occur when a voltage of +12 V and a voltage of −12 V are applied thereto are shown. For comparison, a center frequency shift of a comparative example in which metal structures having a shape in the XY plane equal to the shape of the metal structures 330 and having thickness equal to the thickness of the metal structures 331 are used is also shown. As it is seen from Table 2, whereas the center frequency shift of the comparative example is 0.043 PHz, both the center frequency shifts of the color filters 320 and 321 are 0.027 PHz. In this way, by setting the thickness larger in the metal structures of the color filter having the larger center frequency, it is possible to realize the same frequency resolution irrespective of the center frequency of the color filter.

TABLE 2

|  | Length of one side in XY direction [nm] | Fc [PHz] | ΔFc [PHz] | Metal structure thickness [nm] |
|---|---|---|---|---|
| Color Filter 320 | 20 | 0.497 | 0.027 | 10 |
| Color Filter 321 | 65 | 0.260 | 0.027 | 5 |
| Comparative Example | 20 | 0.412 | 0.043 | 5 |

As the size in the XY plane of the metal structures is smaller, the center frequency of the color filter is larger. Therefore, setting the thickness larger in the metal structures of the color filter having the larger center frequency is equivalent to setting the thickness of the metal structures larger as the size in the XY plane of the metal structures is smaller.

(A-2. Control According to the Distance Between the Metal Structures and the Second Electrode)

Figure 12A:
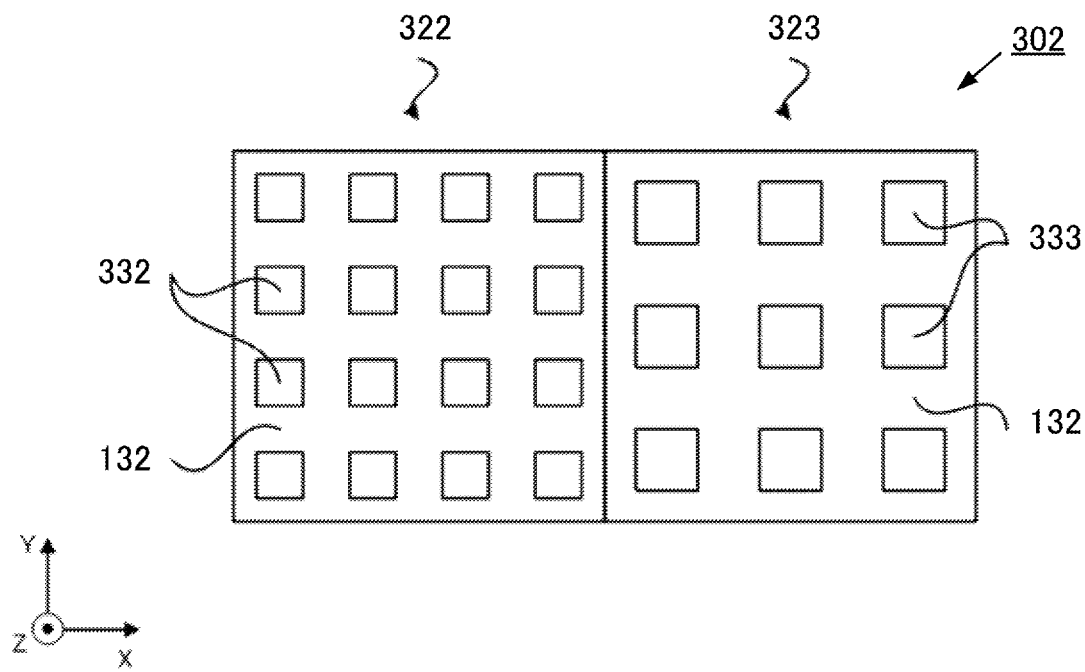
FIGS. 12A and 12B are configuration diagrams of the color filter array according to the third embodiment.
Figure 12B:
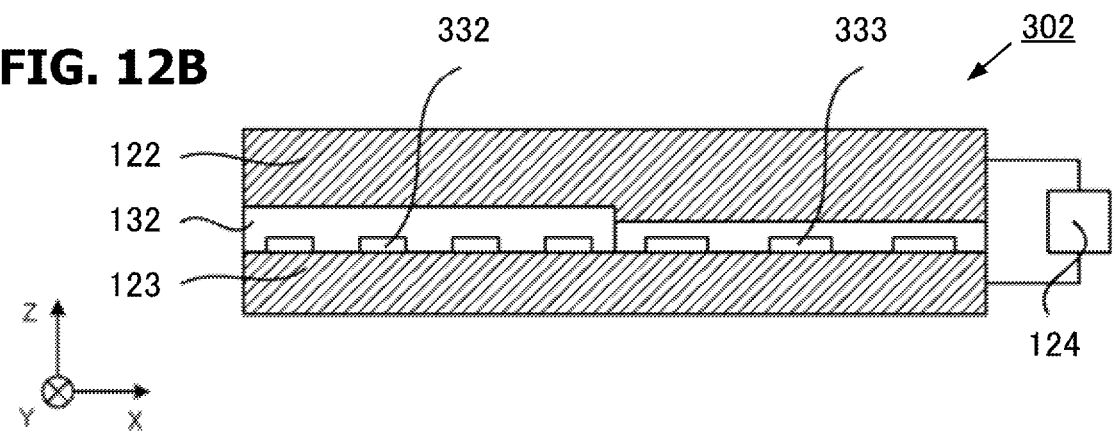

FIGS. 12A and 12B show an example of a color filter array 302 in which the distance d between the metal structures and the second common electrode is changed. FIG. 12A is a plan view of the color filter array 302. FIG. 12B is a sectional view of the color filter array 302. The structure in the XY direction of metal structures 332 and 333 forming color filters 322 and 323 is the same as the structure shown in FIGS. 11A and 11B. However, the thicknesses in the Z direction of the metal structures 332 and 333 are equal at 5 nm. The distance between the metal structures 332 and the second common electrode 122 is 8 nm. The distance between the metal structures 333 and the second common electrode 122 is 5 nm. That is, the color filter 322 and the color filter 323 are configured to have substantially the same values of Fc/d.

In Table 3, center frequency shifts of the color filter 322 and the color filter 323 that occur when a voltage of +12 V and a voltage of −12 V are applied thereto are shown. For comparison, a center frequency shift of a comparative example in which the distance between the metal structures 330 and the common electrode 122 is 5 nm is also shown. A value of Fc/d in the comparative example is set larger than the value in the color filters 322 and 323. As it is seen from Table 3, whereas the center frequency shift of the comparative example is 0.043 PHz, both the center frequency shifts of the color filters 322 and 323 are 0.027 PHz. In this way, by setting the distance between the metal structures and the second common electrode larger in the color filter having the larger center frequency, it is possible to realize the same frequency resolution irrespective of the center frequency of the color filter.

TABLE 3

|  | Length of one side in XY direction [nm] | Fc [PHz] | ΔFc [PHz] | Distance between metal structures and common electrode [nm] |
|---|---|---|---|---|
| Color Filter 322 | 20 | 0.412 | 0.027 | 8 |
| Color Filter 323 | 65 | 0.260 | 0.027 | 5 |
| Comparative Example | 20 | 0.412 | 0.043 | 5 |

As the size in the XY plane of the metal structures is smaller, the center frequency of the color filter is larger. Therefore, setting the distance between the metal structures and the second common electrode larger in the color filter having the larger center frequency is equivalent to setting the distance between the metal structure and the second electrode larger in the color filter as the size in the XY plane of the metal structures of the color filter is smaller.

(A-3. Control According to the Dielectric Constant of the Insulator)

As explained above, the dielectric constants of the insulator in the color filter 320 and the insulator in the color filter 321 may be changed. That is, in the color filter having the larger center frequency, the dielectric constant of the insulator forming the color filter may be set smaller. For example, $SiO_2$ may be used in the color filter 320 and $HfO_2$ may be used in the color filter 321.

As the size in the XY plane of the metal structures is smaller, the center frequency of the color filter is larger. Therefore, setting the dielectric constant of the insulator smaller in the color filter having the larger center frequency is equivalent to setting the dielectric constant of the insulator smaller in the color filter as the size in the XY plane of the metal structures of the color filter is smaller.

<B. Frequency Resolution is Different>

In the following explanation, the necessary frequency resolution is different depending on a frequency. Depending on a purpose of acquisition of spectral information, the necessary frequency resolution is sometimes different according to a frequency band. For example, in some case, whereas finer frequency resolution is requested in a predetermined range, rough frequency resolution is sufficient in the other frequency ranges. In the following explanation, the necessary frequency resolution is fine near a frequency of 0.54 PHz. A frequency band near the frequency of 0.54 PHz is a frequency band in which characteristic absorption peaks of porphyrin and collagen are present. The frequency band is necessary in an imaging device for medical use (a spectral image acquiring device) or the like.

As explained above, the shift amount $\Delta Fc/\Delta V$ of the center frequency per unit voltage is calculated as ($\Delta Fc/\Delta V \sim (Fc/h) \times (\in/d)$) on the basis of the center frequency Fc, the thickness h of the metal structures, the dielectric constant $\in$ of the insulator layer, and the distance d between the metal structures and the second electrode. Therefore, the color filter having the center frequency in the frequency range (near 0.54 PHz), in which finer frequency resolution is requested, is configured to have a small value of $(Fc/h) \times (\in/d)$ compared with the other color filters. Specifically, compared with the center frequency Fc, the thickness h of the metal structures may be set large (thick), the dielectric constant $\in$ of the insulator may be set small, or the distance d between the metal structures and the second common electrode may be set large. Consequently, it is possible to set the shift amount of the center frequency per unit time of the color filter having the center frequency within the predetermined range small compared with the other color filters.

Figure 13A:
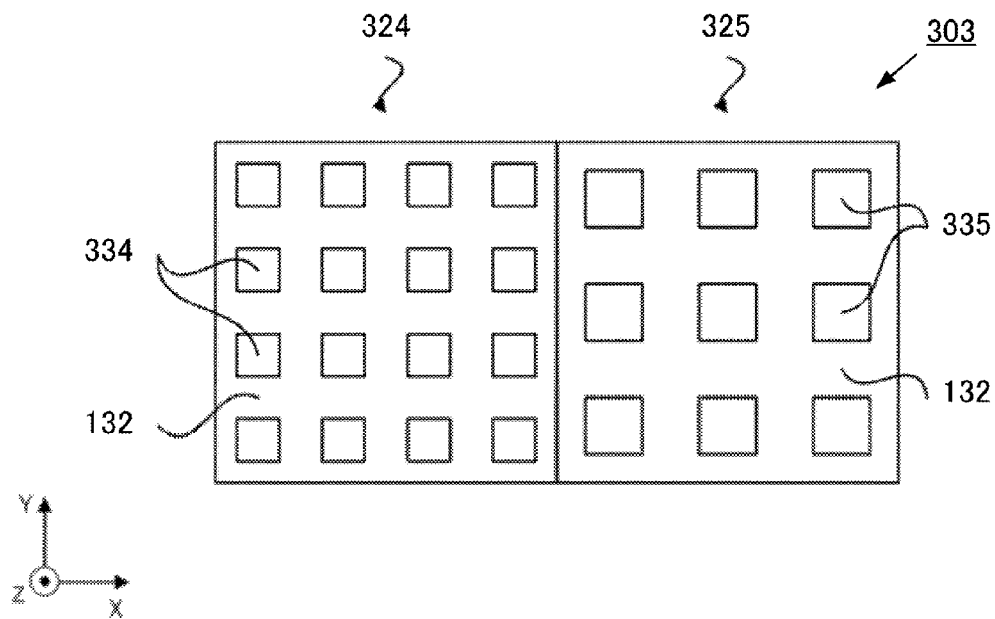
FIGS. 13A and 13B are configuration diagrams of the color filter array according to the third embodiment.
Figure 13B:
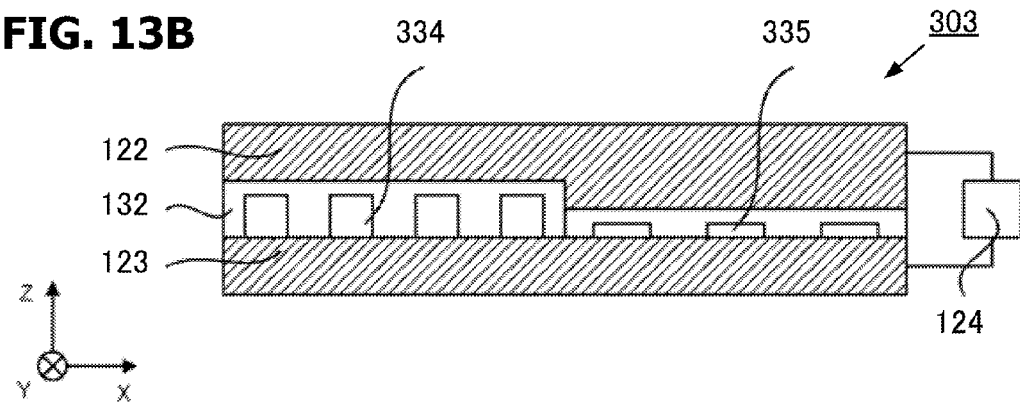

FIGS. 13A and 13B are examples of a color filter array 303 in which the thickness h of the metal structures is changed. FIG. 13A is a plan view of the color filter array 303. FIG. 13B is a sectional view of the color filter array 303. The structure in the XY direction of metal structures 336 and 337 forming color filters 326 and 327 is the same as the structure shown in FIG. 11A. However, the thickness in the Z direction of the metal structures 336 is 20 nm and the thickness in the Z direction of the metal structure 337 is 5 nm. That is, the color filter 326 is configured to have small Fc/h than the color filter 327.

In Table 4, center frequency shifts of the color filters 326 and 327 that occur when a voltage of +12 V and a voltage of −12 V are applied thereto are shown. It is seen from Table 4 that frequency resolution finer than frequency resolution of the color filter 327 is obtained in the color filter 326 having the center frequency near 0.54 PHz. In the example shown in FIGS. 13A and 13B, the thickness of the metal structures is changed. However, as explained above, the center frequency shifts may be controlled by changing the dielectric constant of the insulator or the distance between the metal structures and the second common electrode. Specifically, the dielectric constant of the insulator may be set smaller or the distance between the metal structures and the second common electrode may be set larger in the color filter having the center frequency closer to 0.54 PHz.

TABLE 4

|  | Length of one side in XY direction [nm] | Fc [PHz] | $\Delta$Fc [PHz] | Metal structure thickness [nm] |
| --- | --- | --- | --- | --- |
| Color Filter 326 | 20 | 0.554 | 0.021 | 20 |
| Color Filter 327 | 65 | 0.260 | 0.027 | 5 |

When the necessary frequency resolution is different depending on a frequency in this way, it is possible to improve the quality of spectral information by controlling the sensitivity of the center frequency shift to the voltage according to the necessary frequency resolution.

The range (the predetermined range) in which the frequency resolution (the shift amount of the center frequency per unit voltage) is set fine does not need to be one continuous section and may be two or more sections separated from one another. In these plurality of sections, the frequency resolution does not need to be set the same and may be different.

<Effects of this Embodiment>

In the conventional color filter array disclosed in Japanese Patent Application Laid-open No. 2011-43681, the applied voltages to the circuits provided for the respective color filters are independently controlled to control the frequency resolution of the respective color filters. In the present invention, the center frequencies of the plurality of color filters having the different center frequencies are controlled by the single circuit. Therefore, with a method same as the method in the conventional color filter array, it is difficult to control the frequency resolution. If the structure of the color filter is changed according to the frequency resolution as in this embodiment, it is possible to control the frequency resolution while using the single circuit. Therefore, it is possible to realize the color filter more preferable than the color filters in the first and second embodiments.

<Manufacturing Method for the Color Filter>

To change the metal structures and the distance between the metal structures and the second common electrode for each of the color filters as in the color filter array in the third embodiment, lithography and formation of the metal film and the insulator film may be performed for each of the color filters.

Figure 14A:
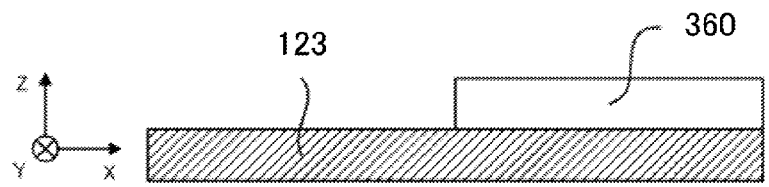
FIGS. 14A to 14E are diagrams for explaining a manufacturing method for the color filter array according to the third embodiment.
Figure 14B:
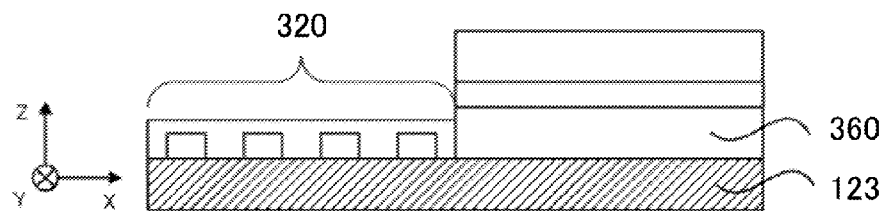
Figure 14C:
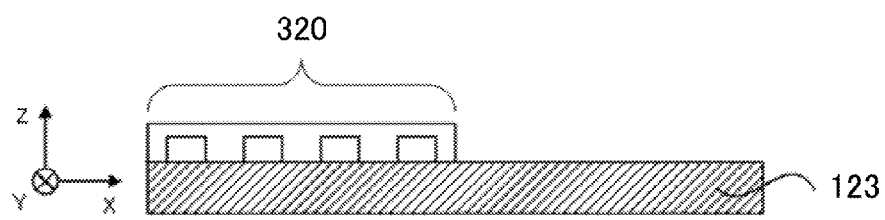
Figure 14D:
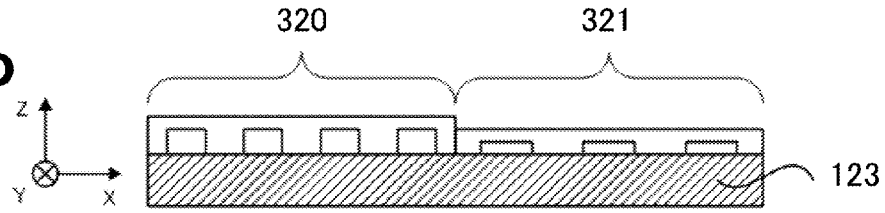
Figure 14E:
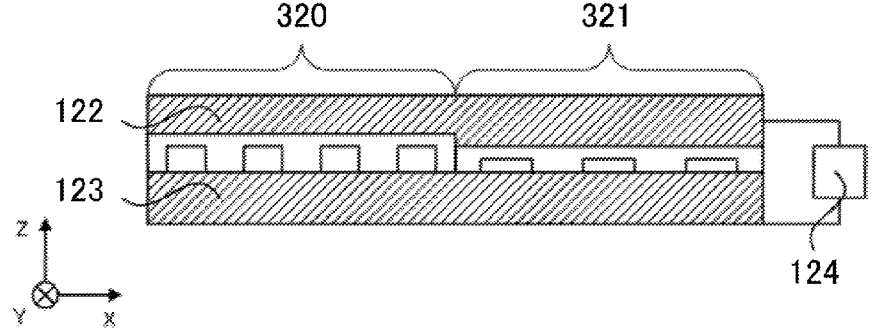

Specifically, the color filter array can be manufactured in a procedure explained below. As an example, a procedure for manufacturing the color filter array 301 shown in FIGS. 11A and 11B is explained with reference to FIGS. 14A to 14E. First, on the common electrode 123, a portion forming the color filter 321 is covered with a sacrificial layer 360 (FIG. 14A). Subsequently, the color filter 320 is manufactured by lithography and liftoff or etching (FIG. 14B). The sacrificial layer 360 is removed by wet etching or the like (FIG. 14C). Thereafter, the color filter 320 is covered with the sacrificial layer again. The color filter 321 is manufactured in the same procedure (FIG. 14D). Lastly, the common electrode 122 is formed and connected to the circuit 124 to complete the color filter array 301 (FIG. 14E).

Fourth Embodiment

A fourth embodiment is different from the first to third embodiments in the configuration of a color filter array in a solid-state image sensor. In a color filter array 425 according to the fourth embodiment, omission and redundancy among frequency bands of spectral information acquired by color filters are eliminated. It is preferable to eliminate omission and redundancy because the spectral information can be efficiently acquired.

Figure 15A:
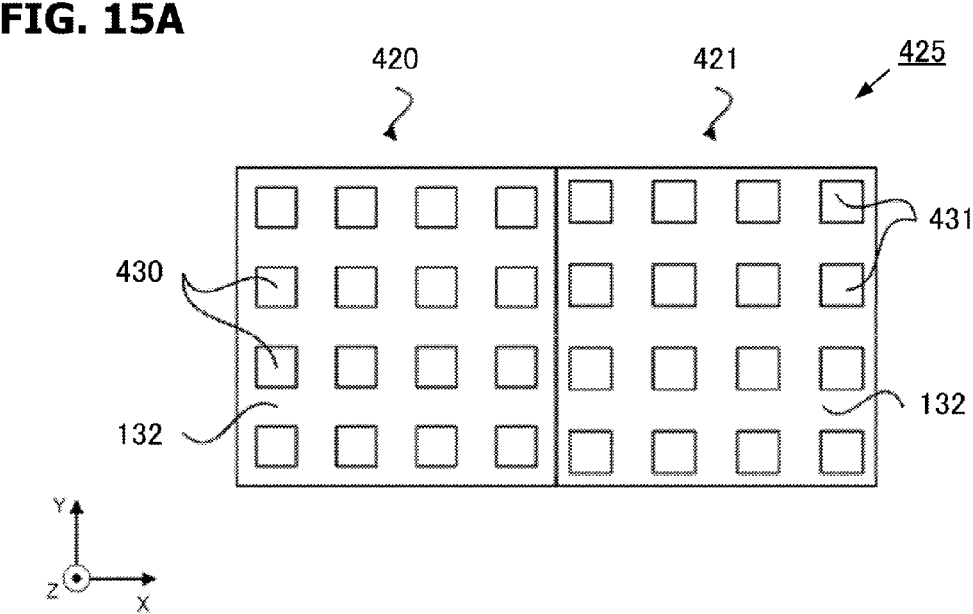
FIGS. 15A and 15B are configuration diagrams of a color filter array according to a forth embodiment.
Figure 15B:
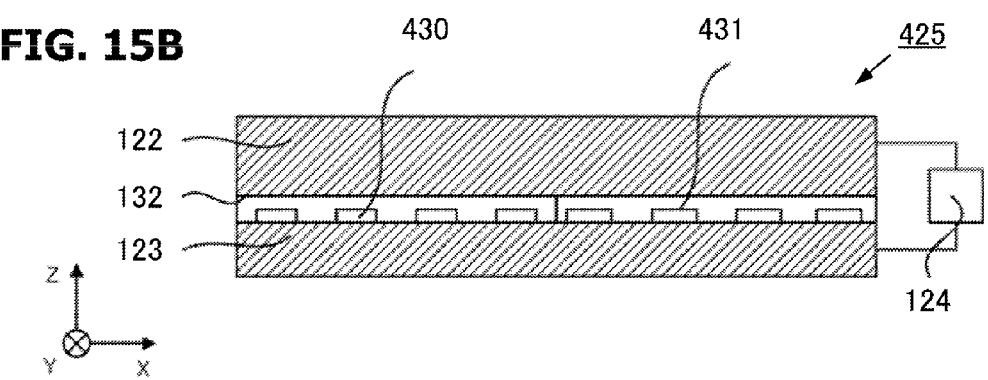

FIGS. 15A and 15B are diagrams showing the structures of color filters 420 and 421 in the color filter array 425 according to the fourth embodiment. FIG. 15A is a plan view of the color filter array 425. FIG. 15B is a sectional view of the color filter array 425. The shape of metal structures 430 forming the color filter 420 is a rectangular parallelepiped having for base a square with a side of 20 nm in the XY plane and a thickness (height) of 5 nm in the Z direction. The metal structures 430 are arranged in a square lattice shape at a cycle of 40 nm. The shape of metal structures 431 forming the color filter 421 is a rectangular parallelepiped having for base a square with a side of 25 nm in the XY plane and a thickness (height) of 5 nm in the Z direction. The metal structures 431 are arranged in a square lattice shape at a cycle of 50 nm. The metal structures 430 and 431 are set in contact with the first common electrode 123 and are separated from the second common electrode 122 by 5 nm via the insulator film 132. The material of the metal structures 430 and 431 is Au and the material of the insulator film 132 is $HfO_2$.

FIGS. 16A and 16B are diagrams respectively showing transmission spectra of the color filter 420 and the color filter 421. Solid lines 1601 and 1611 indicate transmission spectra obtained when a voltage is not applied between the common electrodes 122 and 123. Broken lines 1602 and 1612 indicate transmission spectra obtained when a voltage of +12 V (equivalent to an electric field of +2.4 V/nm) is applied to the common electrode 123 with respect to the common electrode 122. Dotted lines 1603 and 1613 indicate transmission spectra obtained when a voltage of −12 V (equivalent to an electric field of −2.4 V/nm) is applied to the common electrode 123 with respect to the common electrode 122.

When the applied voltage is changed from +12 V to −12 V, the color filter 420 can acquire spectral information in a frequency range of 0.393 PHz to 0.436 PHz and the color filter 421 can acquire spectral information in a frequency range of 0.360 PHz to 0.393 PHz. Therefore, in the color filter array 425, by applying a voltage to the common electrodes 122 and 123 with the single circuit 124, it is possible to acquire spectral information in a frequency range of 0.360 PHz to 0.436 PHz without omission and redundancy.

<Relation Between a Center Frequency and a Frequency Interval>

In particular, a color filter array is assumed that includes color filters, all of the thicknesses of the metal structures, the distances between the metal structures and the second common electrode, and the dielectric constants of the insulators of which are equal. That is, color filters are assumed that have different sizes in the XY plane of the metal structures. In such a color filter array, it is unnecessary to perform lithography and film formation for each of the color filters. Therefore, the color filter array is preferable because manufacturing is easy.

Figure 17:
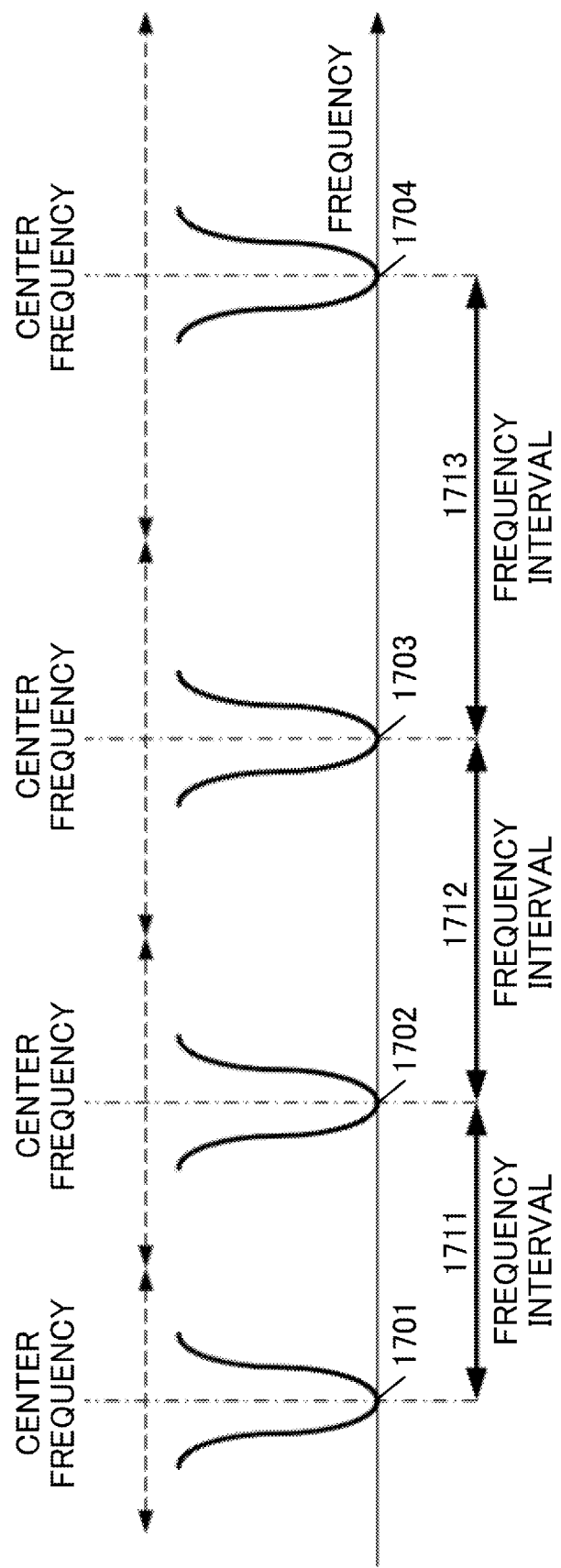
FIG. 17 is a diagram showing center frequency intervals of a plurality of color filters according to the fourth embodiment.

As shown in Table 1, a value obtained by dividing the sensitivity ΔFc of the center frequency shift to the voltage by the center frequency Fc of the color filter is equal irrespective of the center frequency of the color filter. Therefore, as the center frequency of the color filter is larger, spectral information can be acquired in a wider frequency band. Therefore, it is preferable to set a frequency interval wider between the color filter having a larger center frequency and the center frequency of the color filter having the center frequency closest to the center frequency of the color filter. FIG. 17 is a diagram showing transmission spectra of four different center frequencies 1701 to 1704. A frequency interval 1711 is a difference between the center frequency 1702 and the center frequency 1701. Frequency intervals 1712 and 1713 are respectively differences between the center frequency 1703 and the center frequency 1702 and between the center frequency 1704 and the center frequency 1703. As shown in the figure, it is preferable to set the frequency intervals between the color filters, the center frequencies of which are adjacent to each other, larger as the center frequencies are larger. That is, it is preferable to set the intervals to satisfy the following relation: the frequency interval 1711<the frequency interval 1712<the frequency interval 1713. Consequently, it is possible to realize a color filter array that can be easily manufactured and is capable of efficiently acquiring spectral information over a wide band.

[Others]

In the first to fourth embodiments, the color filter arrays are explained in which the two kinds of color filters having the different center frequencies are used. However, three or more kinds of color filters may be used. As the kinds of color filters used in the color filter arrays are increased, spectral information having higher frequency resolution is obtained in a wide band. On the other hand, since the distance between the color filters having the same center frequency increases, resolution of an image that the color filter arrays can acquire decreases. Therefore, the number of color filters may be determined according to necessary frequency resolution and image resolution.

The various embodiments and the modifications of the embodiments are explained above. The present invention can be configured by combining the contents of the embodiments and the modifications as much as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-152857, filed on Jul. 23, 2013, which is hereby incorporated by reference herein in its entirety.

What is claimed is:

1. A color filter array comprising:
   a plurality of color filters having different center frequencies and each formed of static metal structures and an insulator;
   a first common electrode formed across the plurality of color filters;
   a second common electrode opposed to the first common electrode, separated from the static metal structures of the plurality of color filters by the insulator, and formed across the plurality of color filters; and
   a voltage applying circuit configured to apply a voltage between the first common electrode and the second common electrode.

2. The color filter array according to claim 1, wherein sizes of the static metal structures included in each of the plurality of color filters are different from each other.

3. The color filter array according to claim 2, wherein areas of surfaces, parallel to the first and second common electrodes, of the static metal structures included in each of the plurality of color filters are different from each other.

4. The color filter array according to claim 1, wherein thickness of the static metal structures is equal to or larger than 1 nm and equal to or smaller than 20 nm.

5. The color filter array according to claim 1, wherein a distance between the static metal structures and the second common electrode is equal to or larger than 1 nm and equal to or smaller than 20 nm.

6. The color filter array according to claim 1, wherein, when a voltage is applied to the first and second common electrodes, a shift amount of the center frequency per unit voltage is the same in the plurality of color filters.

7. The color filter array according to claim 6, wherein thickness of the static metal structures is larger in the color filter having a higher center frequency.

8. The color filter array according to claim 6, wherein a distance between the static metal structures and the second common electrode is larger in the color filter having a higher center frequency.

9. The color filter array according to claim 6, wherein a dielectric constant of the insulator is smaller in the color filter having a higher center frequency.

10. The color filter array according to claim 1, wherein, when a voltage is applied to the first and second common electrodes, a color filter, among the plurality of color filters, which has a center frequency within a predetermined range has a smaller shift amount of the center frequency per unit voltage than the other color filters.

11. The color filter array according to claim 10, wherein the color filter having a center frequency within the predetermined range has a larger ratio of thickness of the static metal structures to the center frequency, than the other color filters.

12. The color filter array according to claim 10, wherein the color filter having a center frequency within the predetermined range has a larger ratio of a distance between the static metal structures and the second common electrode to the center frequency, than the other color filters.

13. The color filter array according to claim 10, wherein the color filter having a center frequency within the predetermined range has a smaller product of the center frequency and a dielectric constant of the insulator, than the other color filters.

14. The color filter array according to claim 1, wherein, when a voltage is applied to the first and second common electrodes, a value obtained by dividing a product of a center frequency and a dielectric constant by a product of thickness of the static metal structures and a distance between the static metal structures and the second common electrode is smaller in a color filter, among the plurality of color filters, which has a center frequency within a predetermined range, than the other color filters.

15. The color filter array according to claim 14, wherein the color filter having a center frequency within the predetermined range has a larger ratio of the thickness of the static metal structures to the center frequency, a larger ratio of the distance between the static metal structures and the second common electrode to the center frequency, or a smaller product of the center frequency and the dielectric constant of the insulator, than the other color filters.

16. The color filter array according to claim 1, wherein each of the plurality of color filters has a plurality of kinds of the static metal structures having different areas of cross sections parallel to the first and second common electrodes.

17. The color filter array according to claim 16, wherein each of the plurality of color filters further includes an absorption filter that limits a frequency band of light transmitted through the color filter.

18. The color filter array according to claim 16, wherein number density is set higher in the static metal structures having smaller areas of the cross sections parallel to the first and second common electrodes.

19. A solid-state image sensor comprising:
the color filter array according to claim 1; and
pixels corresponding to the plurality of color filters of the color filter array.

20. An imaging device comprising:
an imaging optical system; and
the solid-state image sensor according to claim 19.

* * * * *